US011701592B2

(12) United States Patent
Tsutsumizaki

(10) Patent No.: US 11,701,592 B2
(45) Date of Patent: Jul. 18, 2023

(54) GAME DEVICE, RECORDING MEDIUM, AND GAME SYSTEM

(71) Applicant: KONAMI DIGITAL ENTERTAINMENT CO., LTD., Tokyo (JP)

(72) Inventor: Yota Tsutsumizaki, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 0 days.

(21) Appl. No.: 16/787,839

(22) Filed: Feb. 11, 2020

(65) Prior Publication Data

US 2020/0171392 A1 Jun. 4, 2020

Related U.S. Application Data

(63) Continuation of application No. PCT/JP2018/030284, filed on Aug. 14, 2018.

(30) Foreign Application Priority Data

Aug. 18, 2017 (JP) ................................ 2017-158209

(51) Int. Cl.
*A63F 13/847* (2014.01)
*A63F 13/44* (2014.01)
*A63F 13/56* (2014.01)

(52) U.S. Cl.
CPC ............ *A63F 13/847* (2014.09); *A63F 13/44* (2014.09); *A63F 13/56* (2014.09)

(58) Field of Classification Search
CPC ......... A63F 13/44; A63F 13/847; A63F 13/56
See application file for complete search history.

(56) References Cited

U.S. PATENT DOCUMENTS

| 2017/0080344 A1* | 3/2017 | Odagiri ................... A63F 13/63 |
| 2018/0104586 A1* | 4/2018 | Kim ...................... A63F 13/335 |
| 2018/0161675 A1* | 6/2018 | Miron ................... A63F 13/837 |

FOREIGN PATENT DOCUMENTS

| JP | 2002-351806 A | 12/2002 |
| JP | 2014-79400 A | 5/2014 |
| JP | 2016-16146 A | 2/2016 |

OTHER PUBLICATIONS

Team Fortress 2 High Five!, pulled Mar. 22, 2016 (Year: 2016).*
"Phantasy Star Online", 1st edition, Digicube Co., Ltd., Someo Masamichi, Jan. 31, 2001, pp. 018-021 (total 6 pages).

(Continued)

*Primary Examiner* — Thomas H Henry
(74) *Attorney, Agent, or Firm* — Sughrue Mion, PLLC

(57) ABSTRACT

A non-transitory computer readable recording medium having recorded thereon a program for a game device having a processor, in which the program causes the processor to: receive an operation-input made by a first user; and cause a first character of a game to execute an action, based on the operation-input made by the first user, in which when a first action made by a second character of the game is executed based on an operation-input made by a second user, the program causes the processor to cause the first character to execute a second action responsive to the first action, based on the operation-input made by the first user and received by the receiver.

16 Claims, 14 Drawing Sheets

(56) References Cited

OTHER PUBLICATIONS

[online], Apr. 25, 2016, searched on Feb. 28, 2019, Internet <URL: http://maucha.blog100.fc2.com/blogentry-1648.html> pp. 1-13 (total 13 pages).
"Dengeki PlayStation", KADOKAWA, Apr. 14, 2016, col. 22, No. 12, pp. 186-191 (total 8 pages).
International Search Report for PCT/JP2018/030284 dated Oct. 23, 2018.
Written Opinion of the International Searching Authority for PCT/JP2018/030284 dated Oct. 23, 2018.
Communication dated Jan. 30, 2018 in Japanese Patent Office in JP Application No. 2017-158209.
Communication dated May 15, 2018 in Japanese Patent Office in JP Application No. 2017-158209.
Communication dated Mar. 12, 2019 in Japanese Patent Office in JP Application No. 2017-158209.
Communication dated Jul. 16, 2019 in Japanese Patent Office in JP Application No. 2017-158209.
Communication dated Jul. 27, 2021 by the Japanese Patent Office in Japanese Application No. 2018-148985.
[online] "Details of online cooperative play", May 16, 2013, Searched on Jul. 8, 2021, Retrieved from: URL: https://www.4gamer.net/games/126/G012648/20130516043/ (12 pages).
[online], May 1, 2014, Searched on Jul. 8, 2021, Retrieved from: URL: https://www.dopr.net/framboise/エ モートあれこれ (6 pages).
Notification of Reason for Refusal dated Oct. 8, 2021 from the Korean Intellectual Property Office in KR Application No. 10-2020-7007448.
Notice of Reasons for Refusal dated Mar. 1, 2022 from the Japanese Patent Office in JP Application No. 2018-148985.
Office Action dated Feb. 21, 2023 from the Chinese Patent Office in Application No. 201880053188.2.

* cited by examiner

FIG. 10

| PLAYER CHARACTER MANAGEMENT INFORMATION | USER ID | u005 | TBL1 |
|---|---|---|---|
| | GAME CHARACTER ID | c001 | |
| | CHARACTER TYPE ID | s101 | |
| | TEAM ID | t001 | |
| | POSITION | (216, 397, 025) | |
| | DIRECTION | 30 Degrees | |
| | MAXIMUM HIT POINTS | 500 | |
| | REMAINING HIT POINTS | 480 | |
| | SKILL LEVEL | 7 | |
| | ATTACK POWER | 80 | |
| | DEFENSE POWER | 70 | |
| | MONEY | 6000 GOLDS | |
| | ACTION ID | d003 | |
| | ... | ... | |

FIG. 11

TBL2

| GAME CHARACTER MANAGEMENT INFORMATION ||||||||
|---|---|---|---|---|---|---|---|
| GAME CHARACTER ID | USER ID | TEAM ID | CHARACTER TYPE ID | POSITION | DIRECTION | REMAINING HIT POINT | ACTION ID |
| c002 | u007 | t001 | s102 | (231, 451, 102) | 60 Deg. | 500 | d003 |
| c003 | u012 | t001 | s103 | (245, 453, 036) | 190 Deg. | 260 | d101 |
| c004 | Null | t002 | s001 | (269, 423, 045) | 95 Deg. | 120 | d002 |
| c005 | Null | t002 | s001 | (273, 438, 046) | 92 Deg. | 120 | d002 |
| c006 | Null | t002 | s002 | (195, 259, 056) | 76 Deg. | 950 | d002 |
| ... | ... | ... | ... | ... | ... | ... | ... |

FIG. 12

TBL4

| | | ACTION INFORMATION | | | | | |
|---|---|---|---|---|---|---|---|
| | | ACTION TYPE INFORMATION | | | PURCHASE COST INFO | REFERENCE AREA INFORMATION | |
| ACTION ID | ACTION NAME | COMMUNICATION ACTION APPLICABLE INFO | RESPONSE ACTION APPLICABLE INFO | GENERAL ACTION APPLICABLE INFO | | SHAPE | SIZE |
| d001 | STANDBY | 0 | 0 | 1 | Null | Null | Null |
| d002 | WALKING | 0 | 0 | 1 | Null | Null | Null |
| d003 | RUNNING | 0 | 0 | 1 | Null | Null | Null |
| d004 | ATTACKING | 0 | 0 | 1 | Null | Null | Null |
| d005 | HANDWAVING | 1 | 1 | 0 | Null | ELLIPSE | 100 |
| d006 | APPROVAL | 0 | 1 | 0 | 200 | Null | Null |
| d007 | DENIAL | 1 | 1 | 0 | 200 | Null | Null |
| d008 | SALUTING | 1 | 1 | 0 | 300 | CIRCLE | 10 |
| d009 | HIGH FIVE | 1 | 1 | 0 | Null | RECTANGLE | 1 |
| d010 | HANDSHAKE | 1 | 1 | 0 | 400 | RECTANGLE | 1 |
| ... | ... | ... | ... | ... | ... | ... | ... |

FIG. 13
| ACTION ID | ACTION INFORMATION | | |
|---|---|---|---|
| | ACTION NAME | ACTION-DETAILS-INFORMATION | |
| d001 | STANDBY | dat001 |  |
| d002 | WALKING | dat002 |  |
| d003 | RUNNING | dat003 |  |
| d004 | ATTACKING | dat004 |  |
| d005 | HANDWAVING | dat005 |  |
| d006 | APPROVAL | dat006 |  |
| d007 | DENIAL | dat007 |  |
| d008 | SALUTING | dat008 |  |
| d009 | HIGH FIVE | dat009 |  |
| d010 | HANDSHAKE | dat010 | 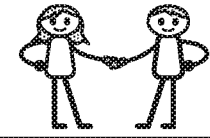 |
| ⋮ | ⋮ | ⋮ | ⋮ |
TBL4

FIG. 14

| ACTION IDs of RESPONSE ACTIONS (ACTION NAME) | ACTION IDs of RESPONSE ACTIONS (ACTION NAME) | | | | | | |
|---|---|---|---|---|---|---|---|
| | d005 (HAND-WAVING) | d006 (APPROVAL) | d007 (DENIAL) | d008 (SALUTING) | d009 (HIGH FIVE) | d010 (HANDSHAKE) | ... |
| d005 (HAND-WAVING) | 1 | 2 | 2 | 0 | 0 | 0 | ... |
| d008 (SALUTING) | 0 | 0 | 0 | 1 | 0 | 0 | ... |
| d009 (HIGH FIVE) | 0 | 0 | 0 | 0 | 1 | 0 | ... |
| d010 (HANDSHAKE) | 0 | 0 | 0 | 0 | 0 | 1 | ... |
| ... | ... | ... | ... | ... | ... | ... | ... |

TBL5, DK

FIG. 15

TBL6

| ACTION ID | ACTION AVAILABILITY MANAGEMENT INFORMATION | | | | |
|---|---|---|---|---|---|
| | ACTION NAME | PURCHASE HISTORY INFO | ACTION AVAILABILITY INFORMATION | | |
| | | | COMMUNICATION ACTION AVAILABILITY INFO | RESPONSE ACTION AVAILABILITY INFO | GENERAL ACTION AVAILABILITY INFO |
| d001 | STANDBY | 2 | 0 | 0 | 1 |
| d002 | WALKING | 2 | 0 | 0 | 1 |
| d003 | RUNNING | 2 | 0 | 0 | 1 |
| d004 | ATTACKING | 2 | 0 | 0 | 1 |
| d005 | HANDWAVING | 2 | 1 | 1 | 0 |
| d006 | APPROVAL | 1 | 0 | 1 | 0 |
| d007 | DENIAL | 0 | 0 | 0 | 0 |
| d008 | SALUTING | 0 | 0 | 1 | 0 |
| d009 | HIGH FIVE | 2 | 1 | 1 | 0 |
| d010 | HANDSHAKE | 0 | 0 | 1 | 0 |
| ⋮ | ⋮ | ⋮ | ⋮ | ⋮ | ⋮ |

GAME DEVICE, RECORDING MEDIUM, AND GAME SYSTEM

CROSS REFERENCE TO RELATED APPLICATIONS

This Application is a Continuation Application of PCT Application No. PCT/JP2018/030284, filed Aug. 14, 2018, which is based on and claims priority from Japanese Patent Application No. 2017-158209, filed Aug. 18, 2017, the entire contents of which are incorporated herein by reference.

BACKGROUND

Field of the Invention

The present invention relates to game devices, recording mediums, and game systems.

Description of Related Art

A technique has been proposed that allows users to communicate with each other using a message exchange means, such as chatting or the like when playing a game in which each of the users operates a player character in a game space (an example of a "virtual space") (for example, see Japanese Patent Application Laid-Open Publication No. 2016-016146).

In the conventional message exchange means, when a user receives a message from another user to whom the user intends to reply, the user must consider a message content for reply and then input the reply message, for example. However, to progress game play, the user is required to operate a player character. As a result, operations of composing and inputting the reply message may be time-consuming.

SUMMARY

The present invention has been made in view of the circumstances described above. An object of the present invention is to provide a technique that allows users to communicate with each other in a less time-consuming manner than that required in the conventional technique, while playing a game in which users operate a player character in a game space.

To achieve the stated object, a recording medium according to an aspect of the present invention is a non-transitory computer readable recording medium having recorded thereon a program for a game device having a processor, the program causing the processor to: receive an operation-input made by a first user; and cause a first character of a game to execute an action, based on the operation-input made by the first user, wherein when a first action made by a second character of the game is executed based on an operation-input made by a second user, the program causes the processor to cause the first character to execute a second action responsive to the first action, based on the operation-input made by the first user and received by the receiver.

A game device according to an aspect of the present invention, includes: a processor; and a memory that is operatively coupled to the processor and is configured to store instructions executed by the processor, in which upon execution of the instructions the processor is configured to: receive an operation-input made by a first user; and cause a first character of a game to execute an action, based on the operation-input made by the first user, in which when a first action made by a second character of the game is executed, based on an operation-input made by a second user, the processor is configured to cause the first character to execute a second action responsive to the first action, based on the operation-input made by the first user and received by the receiver.

A game system according to an aspect of the present invention includes a first game device; and a second game device communicable with the first game device, in which the first game device includes: a first processor; and a first memory that is operatively coupled to the first processor and is configured to store first instructions executed by the first processor, in which upon execution of the first instructions the first processor is configured to: receive an operation-input made by a first user; and cause a first character of a game to execute an action, based on the operation-input made by the first user and received by the first receiver, and in which the second game device includes: a second processor; and a second memory that is operatively coupled to the second processor and is configured to store second instructions executed by the second processor, in which upon execution of the second instructions the second processor is configured to: receive an operation-input made by a second user; and cause a second character of the game to execute a second action responsive to the first action, based on the operation-input made by the second user and received by the second receiver, when the first character executes the first action.

BRIEF DESCRIPTION OF THE DRAWINGS

FIG. 10 shows an example of the data structure of a player character management table TBL1.

FIG. 11 shows an example of the data structure of a game character management table TBL2.

FIG. 12 shows an example of the data structure of an action information table TBL4.

FIG. 13 shows an example of the data structure of the action information table TBL4.

FIG. 14 shows an example of the data structure of a response action information table TBL5.

FIG. 15 shows an example of the data structure of an action availability management table TBL6.

DESCRIPTION OF THE EMBODIMENTS

Embodiments for implementing the invention are described with reference to the figures. In the figures, the depicted dimensions and scales of the components may differ, as appropriate, from actual corresponding components. The embodiments set out below are specific examples of the invention, and include various and preferable limitations. However, the scope of the invention is not limited to the limitations of the embodiments, unless specifically stated otherwise.

A. Embodiment

An embodiment of the present invention will now be described

1. Overview of Game System

Figure 1:
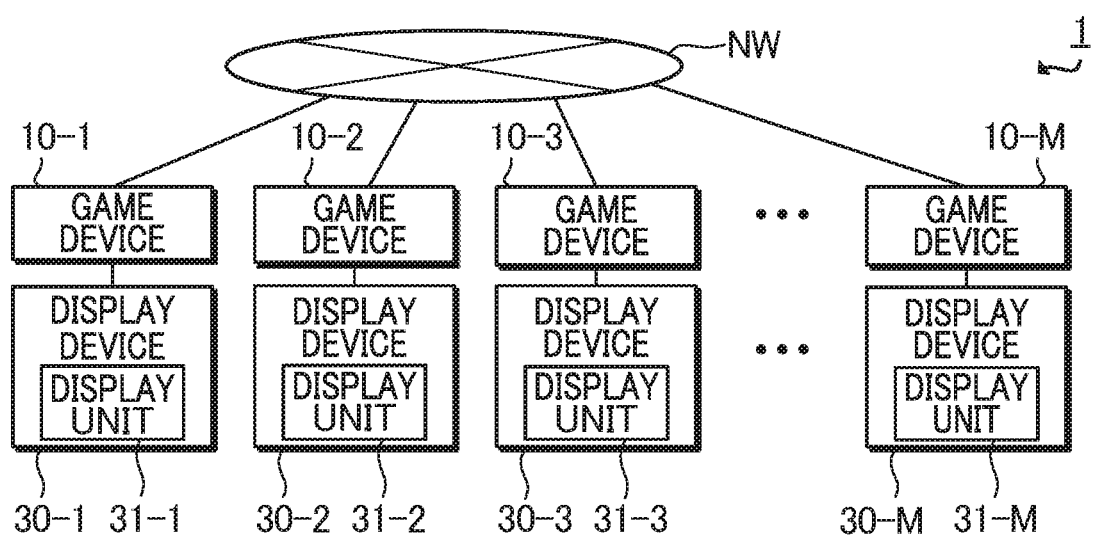
FIG. 1 is a diagram illustrating an example of an overview of a game system 1 according to an embodiment of the present invention.

FIG. 1 provides an overview of a game system 1 according to the embodiment. Hereafter, when reference is made to FIG. 1, it is assumed that an overview of the game system 1 is being described.

As exemplified in FIG. 1, the game system 1 includes game devices 10-1 to 10-M, each of which can execute an exploratory game (an example of a "game"), and display devices 30-1 to 30-M respectively correspond to the game devices 10-1 to 10-M (where M is a natural number equal to or greater than one). In the following description, among the game devices 10-1 to 10-M, an m-th game device 10 may on occasion be referred to as a game device 10-$m$ (where m is a natural number satisfying a relation 1≤m≤M). Likewise, among the display devices 30-1 to 30-M, the m-th display device 30 may on occasion be referred to as a display device 30-$m$.

In this embodiment, it is assumed that the game device 10 is an example of a device for home use. However, any information processing device may be adopted as the game device 10. For example, the game device 10 may be an arcade game device installed in a shop, a gaming facility or the like; or may be a mobile device, such as a mobile phone or a smartphone or the like; or may be a terminal-type information device, such as a personal computer or the like.

The game device 10-$m$ is communicable with the display device 30-$m$, which is provided in corresponding relation to the game device 10-$m$. The game device 10-$m$ is thus able to display on the display unit 31-$m$ an image relating to the exploratory game executed in the game device 10-$m$. The display device 30-$m$ is equipped with the display unit 31-$m$ provided in corresponding relation to the game device 10-$m$.

Among the game devices 10-1 to 10-M, the game device 10-1 is communicable with the game device 10-2 via a network NW Specifically, the game device 10-1 transmits, to the game device 10-2, information on the exploratory game executed in the game device 10-1. The game device 10-2 transmits, to the game device 10-1, information on the exploratory game executed in the game device 10-2. Accordingly, information on the exploratory game executed in each game device 10-$m$ can be shared among the game devices 10-1 to 10-M. Consequently, a user U1 of the game device 10-1 and a user U2 (another user) of the game device 10-2 can cooperate with each other to complete a mission, or battle against each other in playing the exploratory game. In this embodiment, a case is assumed in which the user U1 of the game device 10-1 and the user U2 of the game device 10-2 cooperate with each other to complete a mission in the exploratory game.

In this embodiment, a case is exemplified in which the game devices 10 communicate with each other via the network NW and execute the exploratory game. However, the present invention is not limited to such an aspect. For example, each game device 10 may execute the exploratory game in isolation without communication with another game device 10. In this case, a user U of each game device 10 is able to play the exploratory game alone. In this embodiment, a case is assumed, for example, in which each of the game device 10 is operated by a respective solo user U. However, the present invention is not limited to such a configuration. The users U may operate a single game device 10, thereby allowing the users U who operate together a single game device 10 to cooperate with (or battle against) each other in playing the exploratory game.

In this embodiment, the exploratory game executed in the game device 10 is, for example, a game in which one of the users U of the game device 10 operates the game device 10 to cause a player character, which is a target of an operation of the one of the users U of the game device 10, to perform an action in a virtual field Fd (an example of a "virtual space") the exploratory game to thereby achieve a predetermined mission set in the exploratory game. In this embodiment a case is assumed, for example, in which a player character operated by the one of the users U1 of the game device 10-1 and a player character operated by the user U2 of the game device 10-2 cooperate with each other to achieve the predetermined mission.

In the following description, for convenience of description, in some cases the player character operated by the user U1 (an example of a "first user") will be referred to as a player character CP (an example of a "first character"), and the player character operated by the user U2 (an example of a "second user") will be referred to as a friend character CF (an example of "second character"), in some cases.

In this embodiment, a case is assumed, for example, in which the field Fd is a three-dimensional space. It is of note that the field Fd may also be a two-dimensional space. In this embodiment, a case is assumed, for example, in which the predetermined mission is a task of defending a defense point provided in a field Fd against an enemy character CE present in the field Fd. Examples of the predetermined mission include defeating the enemy character CE present in the field Fd, obtaining a predetermined item in the field Fd, rescuing a predetermined friendly character present in the field Fd, to be achieved by the user U of the game device 10 before expiry of a preset play time period of the exploratory game, with points being obtained by the user U of the game device 10 in the exploratory game upon expiry of the present time play period, and the like.

In the following description, the player characters, including the player character CP, the friend character CF, and the enemy character CE, in some cases will be collectively referred to as game characters CG.

2. Game Device Configuration

Hereafter, referring to FIGS. 2 and 3, an overview of the game device 10 will be described.

Figure 2:
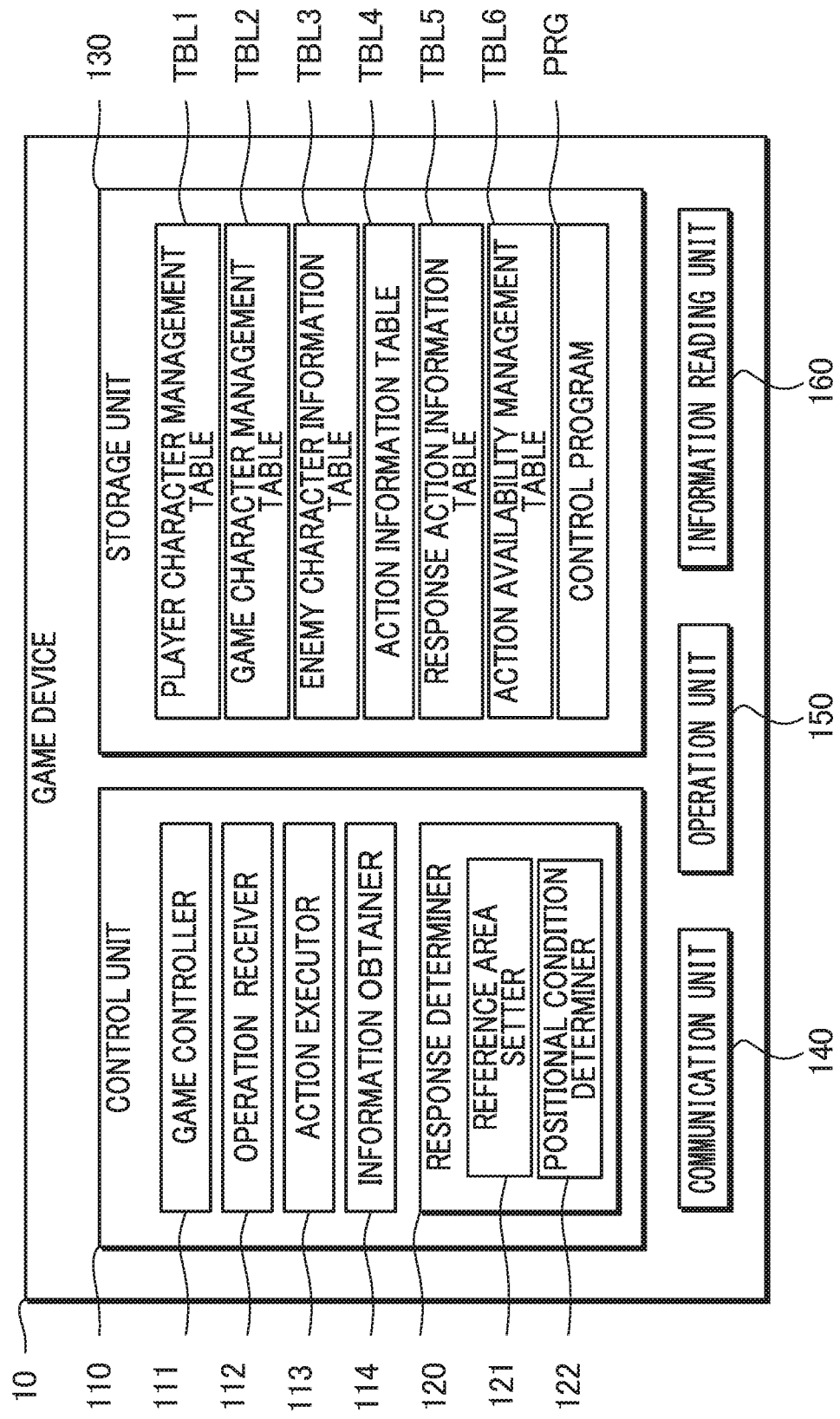
FIG. 2 is a block diagram showing an example of the configuration of a game device 10.

FIG. 2 is a block diagram showing an example of the configuration of the game device 10.

As shown in FIG. 2, the game device 10 includes a control unit 110 that controls each component of the game device 10, a storage unit 130 that stores various pieces of information, a communication unit 140 for executing communication between a corresponding display 30 and an external device such as another game device 10 or the like, an operation unit 150 for receiving an operation-input made by the user U of the game device 10, and an information reading unit 160 for reading information from a recording medium such as an optical disk or the like.

The control unit 110 includes a game controller 111, an operation receiver 112 (an example of a "receiver"), an action executor 113, an information obtainer 114, and a response determiner 120 (an example of a "determiner"). Among these components, the game controller 111 controls the progress of the exploratory game executed in the game device 10.

When the user U of the game device 10 operates the operation unit 150, the operation receiver 112 receives the operation-input. The action executor 113 causes a game character CG (player character) serving as an operation target of the user U of the game device 10 to execute an action, on the basis of the operation-input made by the user U of the game device 10 and received by the operation receiver 112.

Here, "operation of the game character" refers to a change in one or both of the position and posture of the game character CG in the field Fd, and pose by the game character CG. The "posture of the game character" may refer to one of or to both the body position of the game character CG in the field Fd and the orientation or direction of the game character CG in the field Fd. "The game character CG poses" means that the game character CG adopts a predetermined posture in the field Fd. When the game character CG poses, at least one of the position and attitude of the game character CG may change, or conversely neither the position nor attitude of the game character CG may change.

When the game device 10 operated by the user U and another game device 10 operated by another user U communicate with each other to cooperate in executing the exploratory game, the information obtainer 114 obtains the information on the exploratory game from the other game device 10 via the communication unit 140.

In this embodiment a case is assumed in which a communication action, a response action, and a general action exist as actions executable by the player character.

In this embodiment, the communication action (intention declaration action) is an example of a "first action" and refers to an action of a player character in declaring an intention of the user U operating the player character to another user. Examples of the communication actions include, for example, actions including "handwaving," "saluting" (hereafter on occasion, simply, "salute"), "requesting high five" (hereafter on occasion, simply "high five"), "requesting a handshake" (hereafter on occasion, simply "handshake"), and "performs a predetermined pose as a communication action" (hereafter on occasion, simply "posing") or the like. It is of note that, in the present invention, communication action is not limited to an action made by the user U in declaring an intention to another user U. The communication action may be any action that does not affect the progress of the exploratory game.

The phrase "action without affecting the progress of the exploratory game" means, for example, that one, some, or all actions are made by the player character without affecting the continuity of the exploratory game, without affecting the state of the player character, and without affecting the state of the enemy character CE.

Here, the phrase "continuity of the exploratory game by the player character" refers to continuous play of the exploratory game by operation of the player character, and to, for example, a situation whereby when the exploratory game continues to be played by operation of the player character, the game is not over.

The phrase "state of the player character" refers to one or all of two states: a state pertaining to a possibility of survival of the player character; and a state pertaining to a capability of the player character. Among these states, the phrase "a possibility of survival of the player character" refers to a possibility that the player character remains active in the exploratory game, and also refers to, for example, a vitality (remaining hit points) available for the player character; to a limited extent of damage received by the player character, or the like. The phrase "capability of the player character" refers to, for example one, some or all of the following: the player character's attack capability; defense capability; survival capability; and intelligence quotient; and the like.

The "state of the enemy character CE" refers to one or all of two states: state pertaining to the survival possibility of the enemy character CE; and a state pertaining to the capability of the enemy character CE.

In this embodiment, the response action is an example of the "second action" and is an action that the player character operated by the user U executes corresponding to a communication action when another player character operated by another user U executes the communication action. Examples of the response actions include actions of "handwaving," "performing a pose indicating an approval" (hereafter on occasion, simply, "approval"), "performing a pose indicating denial" (hereafter on occasion, simply, "denial"), "saluting," "responding to high five" (hereafter on occasion, simply, "high five"), "responding to a handshake" (hereafter on occasion, simply, "handshake"), "performing a predetermined pose as a response action" (hereafter on occasion, simply, "posing"), and other similar actions.

In the present invention, the response action is not limited to the action executed corresponding to the communication action. The response action may be any action that does not affect the progress of the exploratory game.

In this embodiment, a general action includes collective actions other than the communication action and the response action among the actions executable by the player character. Examples of the general action include actions such as "walking," "running", "attacking the enemy character CE", or any of other similar actions. In this embodiment, for convenience of description, examples of a concept of "general action" also include the player character on "standby" and not executing any action.

When another player character executes the communication action, the response determiner 120 determines whether the player character can execute the response action corresponding to the communication action.

In this embodiment, the response determiner 120 includes a reference area setter 121, and a positional condition determiner 122.

When another player character executes the communication action, the reference area setter 121 sets a reference area corresponding to the other player character. Here, the reference area is an area in which when the other player character executes the communication action, and the player character can execute a response action dependent on the communication action. In this embodiment, the reference area setter 121 sets the reference area at a position that includes the other player character that executed the communication action. In this embodiment, the reference area setter 121 sets the reference area to have a shape that corresponds to the type of the communication action executed by the other player character. In this embodiment, the reference area setter 121 sets the size of the reference area to a size that corresponds to the type of the communication action executed by the other player character.

When the communication action is executed by another player character, the positional condition determiner 122 determines whether the player character is present in the reference area set that corresponds to the other player character. If the player character is present in the reference area set that corresponds to the other player character, the player character can execute a response action that corresponds to the communication action executed by the other player character.

In the following description, the position and orientation of the player character, and the shape and size of the reference area set that corresponds to the player character is referred to as positioning the player character. That is, in this embodiment, when the position of the player character and the position of the other player character have a predetermined positional relationship, the action executor 113 can cause the player character to execute a response action that corresponds to the communication action made by the other player character.

As exemplified in FIG. 2, the storage unit 130 stores a player character management table TBL1, a game character management table TBL2, an enemy character information table TBL3, an action information table TBL1, a response action information table TBL5, an action availability management table TBL6, and a control program PRG of the game device 10.

As will be described in detail later, the player character management table TBL1 stores information for managing the player character CP in the exploratory game (hereafter referred to as "player character management information"), such as the position of the player character CP in the field Fd, the orientation in which the player character CP faces in the field Fd (the orientation of the player character CP), the action details of the player character CP, and the vitality remaining in the player character CP (remaining hit points) or the like.

The game character management table TBL2 stores information for managing the game character CG in the exploratory game (hereafter referred to as "game character management information"), such as the position of the game character CG in the field Fd, the orientation of the game character CG in the field Fd, the action details of the game character CG, and the remaining hit points of the game character CG or the like. Hereafter, the player character management information and the game character management information will on occasion be referred to collectively as game progress information.

The enemy character information table TBL3 stores information on the enemy character CE that may appear in the exploratory game (hereafter referred to as "enemy character information").

The action information table TBL4 stores information on the actions that exist in the exploratory game (hereafter referred to as "action information").

The response action information table TBL5 stores information on the response actions (hereafter referred to as "response action information"); when the player character executes a communication action, the other player character can execute a response action depending on the communication action.

The action availability management table TBL6 stores information on actions executable by the player character (hereafter referred to as "action availability management information").

The control program PRO is a program for controlling the game device 10. In this embodiment, the control program PRG includes, for example, an operating system program for controlling each component of the game device 10, and an application program (game program) for causing the game device 10 to execute the exploratory game. Among these programs, the application program, for example, may be read from the information reading unit 160, and stored in the storage unit 130 when the user U of the game device 10 starts the exploratory game.

Figure 3:
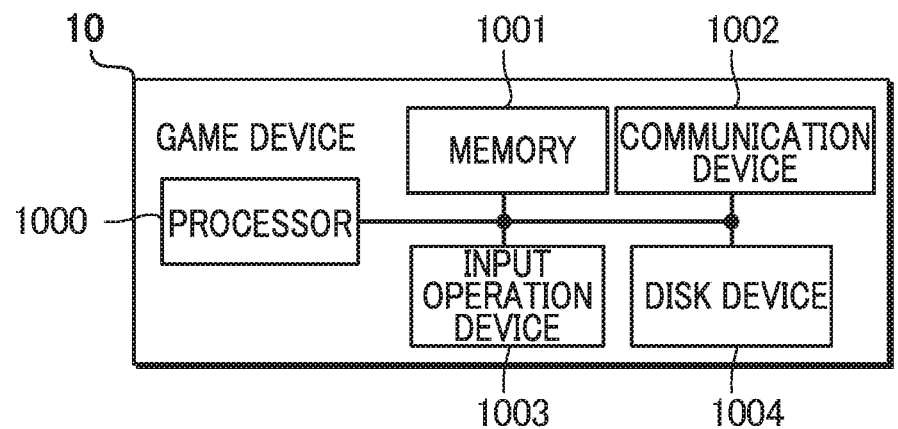
FIG. 3 shows an example of a hardware configuration of the game device 10.

FIG. 3 shows an example of the hardware configuration of the game device 10.

As shown in FIG. 3, the game device 10 includes a processor 1000 that controls each component of the game device 10, a memory 1001 that stores various information, a communication device 1002 for communication with an external device located exterior to the game device 10, an input operation device 1003 for receiving an operation-input made by the user U of the game device 10, and a disk device 1004 for reading information from a recording medium.

The memory 1001 is a non-transitory recording medium. For example, the memory 1001 includes a volatile memory, such as RAM (Random Access Memory) or the like, which serves as a working area for the processor 1000, and a non-volatile memory, such as an EEPROM (Electrically Erasable Programmable Read-Only Memory) or the like, which is used for storing various information, such as the control program PRO or the like of the game device 10, and provides functions such as those of the storage unit 130.

The processor 1000 is, for example, a CPU (Central Processing Unit). The processor 1000 executes the control program PRG stored in the memory 1001, and operates in accordance with the control program PRG, to thereby function as the control unit 110.

The communication device 1002 is hardware for effecting communication with an external device located exterior to the game device 10 via one or both of a wired network and a wireless network, and provides the same functions as those provided by the communication unit 140.

The input operation device 1003 consists of for example, operation buttons, and provides the same functions as those provided by the operation unit 150 that receives an operation-input made by the user U of the game device 10.

The disk device 1004 is, for example, an optical disk device or the like, and provides the same functions as those provided by the information reading unit 160, which reads various information, such as the control program PRO or the like, recorded on medium, such as an optical disk.

It is of note that the processor 1000 may be configured to include additional hardware, such as a GPU (Graphics Processing Unit), a DSP (Digital Signal Processor) or an FPGA (Field Programmable Gate Array) or the like, in addition to the CPU or in place of the CPU. In this case, a part of or the entirety of the functionality of the control unit 110 realized by the processor 1000 may be realized by other hardware, such as a DSP or the like.

3. Game Overview

Referring to FIGS. 4 to 8, an overview of the exploratory game executed by the game device 10 according to this embodiment will be described.

FIGS. 4 to 8 show examples of the field screen G1 that represents the field Fd of the exploratory game. When the game device 10 executes the exploratory game, the game controller 111 of the game device 10 displays the field screen G1 on the display unit 31 of the display device 30 provided in correspondence to the game device 10.

In FIGS. 4 to 8, a case is assumed in which the user U1 of the game device 10-1 and the user U2 of the game device 10-2 cooperate with each other and execute the exploratory game. It is of note that FIGS. 4 to 8 show examples of the field screen G1 displayed on the display unit 31-1 of the display device 30-1 corresponding to the game device 10-1.

As shown in FIGS. 4 to 8, the field screen G1 displayed on the display unit 31-1 includes, for example, a field image GFd representative of the field Fd of the exploratory game, a character image GcP representative of the player character CP operated by the user U1 of the game device 10-1, a character image GcF representative of the friend character CF operated by the user U2 of the game device 10-2, and a character image GcE representative of the enemy character CE present in the field Fd.

Figure 4:
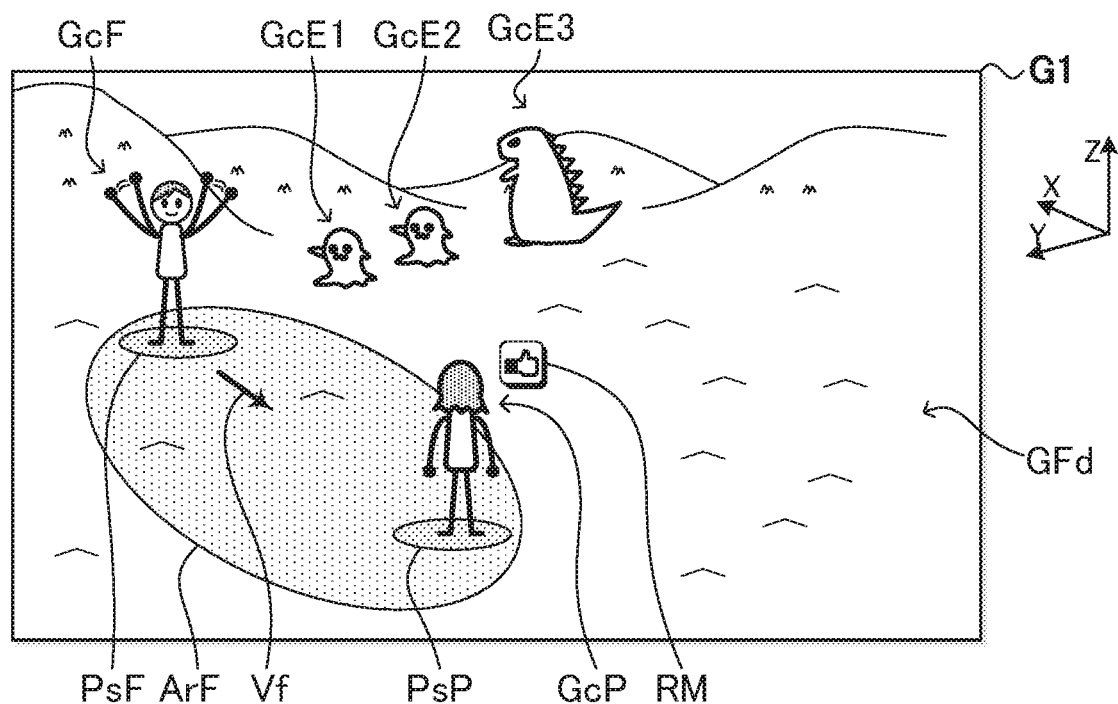
FIG. 4 is a diagram illustrating an example of a field screen G1.

FIG. 4 exemplifies the field screen G1 displayed on the display unit 31-1 corresponding to the game device 10-1 when the friend character CF operated by the user U2 of the game device 10-2 executes a communication action. In FIG. 4 a case is assumed in which the communication action executed by the friend character CF is a "handwaving" action.

When the user U2 operates the game device 10-2 and causes the friend character CF to execute the communication action, the game controller 111 of the game device 10-2 controls each component of the game device 10-2 to transmit, to the game device 10-1, game character management information indicating that the friend character CF has executed the communication action.

When the information obtainer 114 of the game device 10-1 obtains the game character management information indicating that the friend character CF has executed the communication action, the game controller 111 of the game device 10-1 displays on the field screen G1 how the friend character CF executed the communication action, as shown in FIG. 4.

Upon obtaining the game character management information indicating that the friend character CF has executed the communication action, the reference area setter 121 of the game device 10-1 sets the reference area in the field Fd to include a position PsF in which the friend character CF is present. In this case, the reference area setter 121 of the game device 10-1 sets the reference area to have a shape that corresponds to the communication action executed by the friend character CF. The reference area setter 121 of the game device 10-1 then displays on the field screen G1 a reference area image ArF representative of the set reference area. FIG. 4 exemplifies a case in which the reference area setter 121 sets the reference area as an oval area, as follows. The oval are includes the position PsF of the friend character CF in the field Fd and its major axis is in an orientation that is essentially the same as the orientation Vf of the friend character CF.

In this embodiment, a case is assumed in which when the friend character CF operated by the user U2 of the game device 10-2 executes the communication action, the reference area setter 121 of the game device 10-1 sets the reference area corresponding to the friend character CF. However, the present invention is not limited to such an aspect. Alternatively, the reference area setter 121 of the game device 10-2 may set the reference area corresponding to the friend character CF. In this case, it is preferable for the game controller 111 of the game device 10-2 to control transmission of information, to the game device 10-1, which indicates the reference area set by the reference area setter 121 of the game device 10-2.

When the friend character CF operated by the user U2 of the game device 10-2 executes the communication action, the positional condition determiner 122 of the game device 10-1 determines whether a position PsP in which the player character CP is present is within the reference area. If the determination result is affirmative, the positional condition determiner 122 displays on the field screen G1 a response-possible mark RM indicative that the player character CP can execute a response action dependent on the communication action made by the friend character CF, as shown in FIG. 4.

Figure 5:
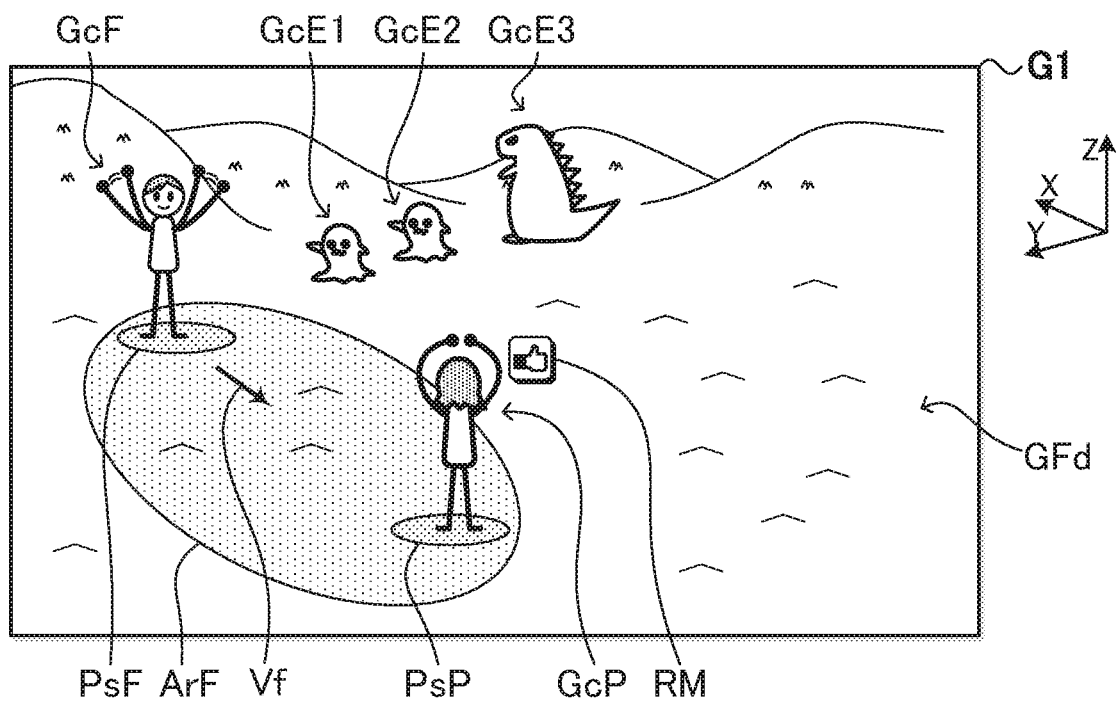
FIG. 5 is a diagram illustrating an example of the field screen G1.
Figure 6:
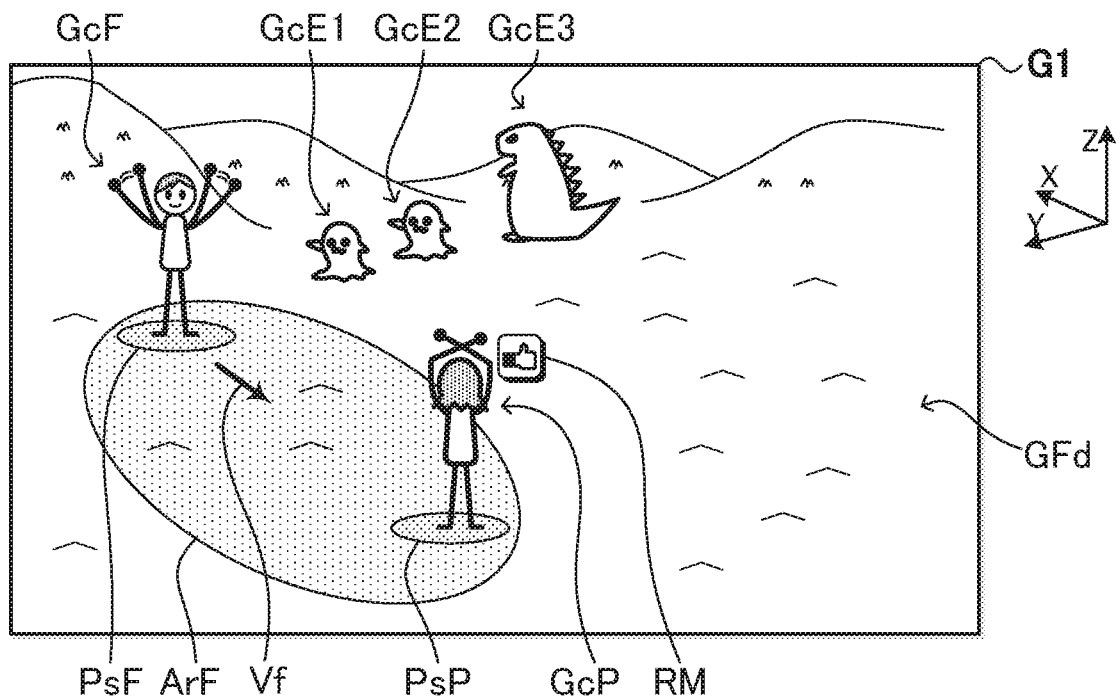
FIG. 6 is a diagram illustrating an example of the field screen G1.

FIGS. 5 and 6 show examples of the field screen G1 in a case in which the response-possible mark RM is displayed on the field screen G1. Specifically, FIGS. 5 and 6 show examples of a case in which the player character CP operated by the user U1 of the game device 10-1 executes the response action dependent on the communication action executed by the friend character CF operated by the user U2 of the game device 10-2.

When the response-possible mark RM is displayed, dependent on the communication action executed by the friend character CF operated by the user U2, the action executor 113 can cause the player character CP to execute a response action that corresponds to the communication action made by the friend character CF on the basis of the operation-input made by the user U1 via the operation unit 150.

In this embodiment a case is assumed in which the player character CP can execute one or more response actions dependent on the communication action made by the friend character CF. That is, in this embodiment, when the response-possible mark RM is displayed, the user U1 operating the player character CP can operate the operation unit 150 so as to allow one type of response action to be selected from among the one or more types of response actions that are executable dependent on the communication action made by the friend character CF, thereby allowing the player character CP to execute the selected response action.

In this embodiment, even if the response-possible mark RM is displayed, the user U1 operating the player character CP can elect not to select a response action that corresponds to the communication action executed by the friend character CF, thereby prompting the player character CP to not execute a response action.

As shown in FIG. 4, there is a case in which the user U2 operating the friend character CF causes the friend character CF to execute the communication "handwaving" action, thereby, for example, to declare an intention to demand to fight together against the enemy character CE present adjacent to the friend character CF. In this case, the user U1 operating the player character CP can cause the player character CP to execute the response action "approval" thereby, for example, to declare an intention to approve fighting together against the enemy character CE, as shown in FIG. 5. Alternatively, the user U1 operating the player character CP can cause the player character CP to execute the response action "denial" thereby, for example, to declare an intention to refuse to fight together against the enemy character CE, as shown in FIG. 6.

Figure 7:
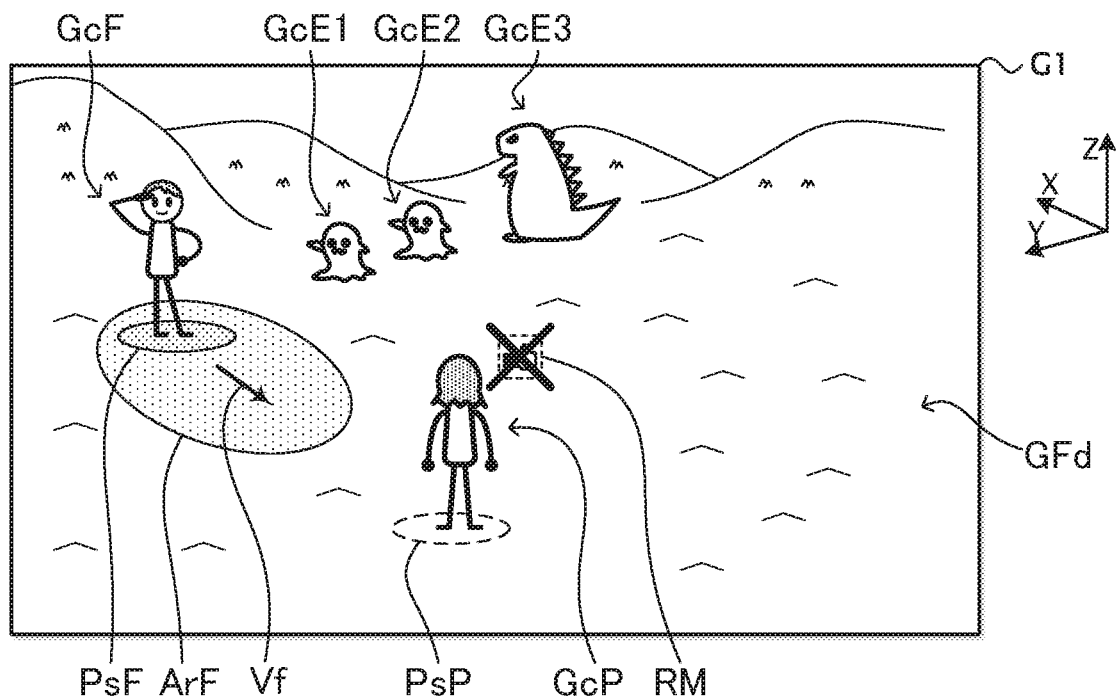
FIG. 7 is a diagram illustrating an example of the field screen G1.

In this embodiment, as shown in FIG. 7, if the positional condition determiner 122 determines that the position PsP in which the player character CP is present does not exist in the reference area provided corresponding to the friend character CF, the positional condition determiner 122 does not display the response-possible mark RM in the field screen G1. In this case, the user U1 who operates the player character CP is not able to cause the player character CP to execute the response action corresponding to the communication action executed by the friend character CF.

Figure 8:
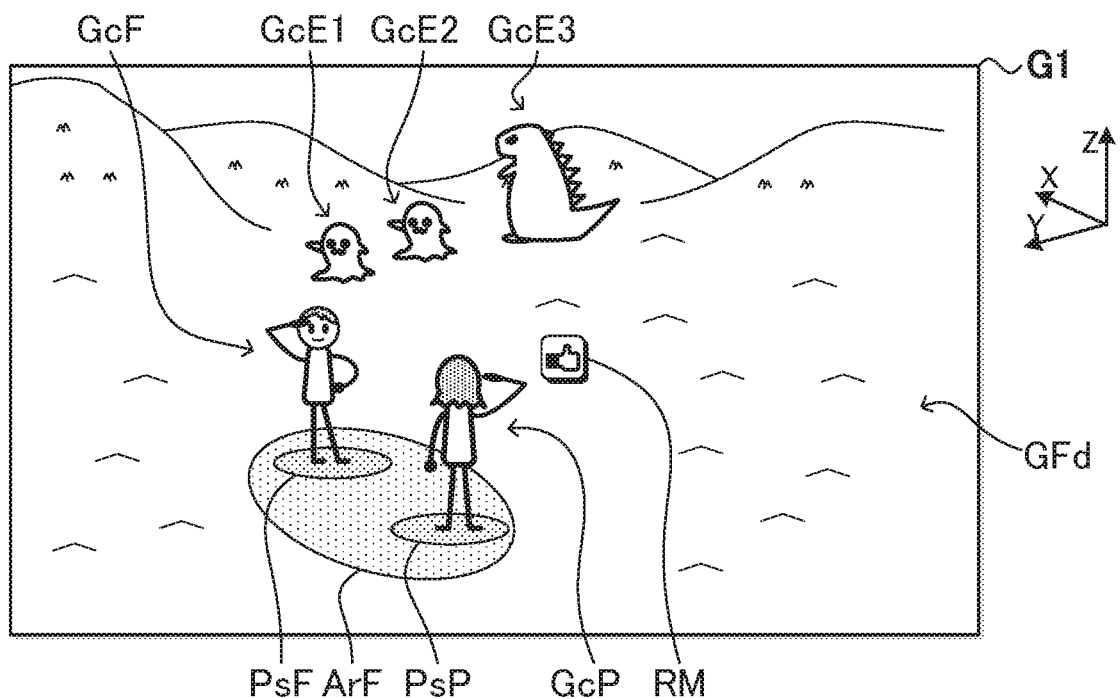
FIG. 8 is a diagram illustrating an example of the field screen G1.

Consequently, when the user U2, who operates the friend character CF, intends to cause the player character CP to execute the response action responsive to the execution of the communication action made by the friend character CF, the user U2 causes the friend character CF to approach the player character CP until the player character CP enters the reference area provided corresponding to the friend character CF and to then cause the friend character CF to execute the communication action, as shown in FIG. 8.

It is of note that the gesture made by the player character when executing the "handwaving" action shown in FIGS. 4 to 6 is a more expansive gesture than that made by the player character when executing the "saluting" action shown in FIGS. 7 and 8. Consequently, the reference area setter 121 according to this embodiment sets the reference area to correspond to the player character when the player character executes the communication "handwaving" action that covers a larger area than the reference area set to correspond to the player character when executing the communication "saluting" action.

4. Game Device Operation

Referring to FIGS. 9 to 15, an example of the operation of the game device 10 in a case in which the game device 10 executes the exploratory game will now be described.

Figure 9:
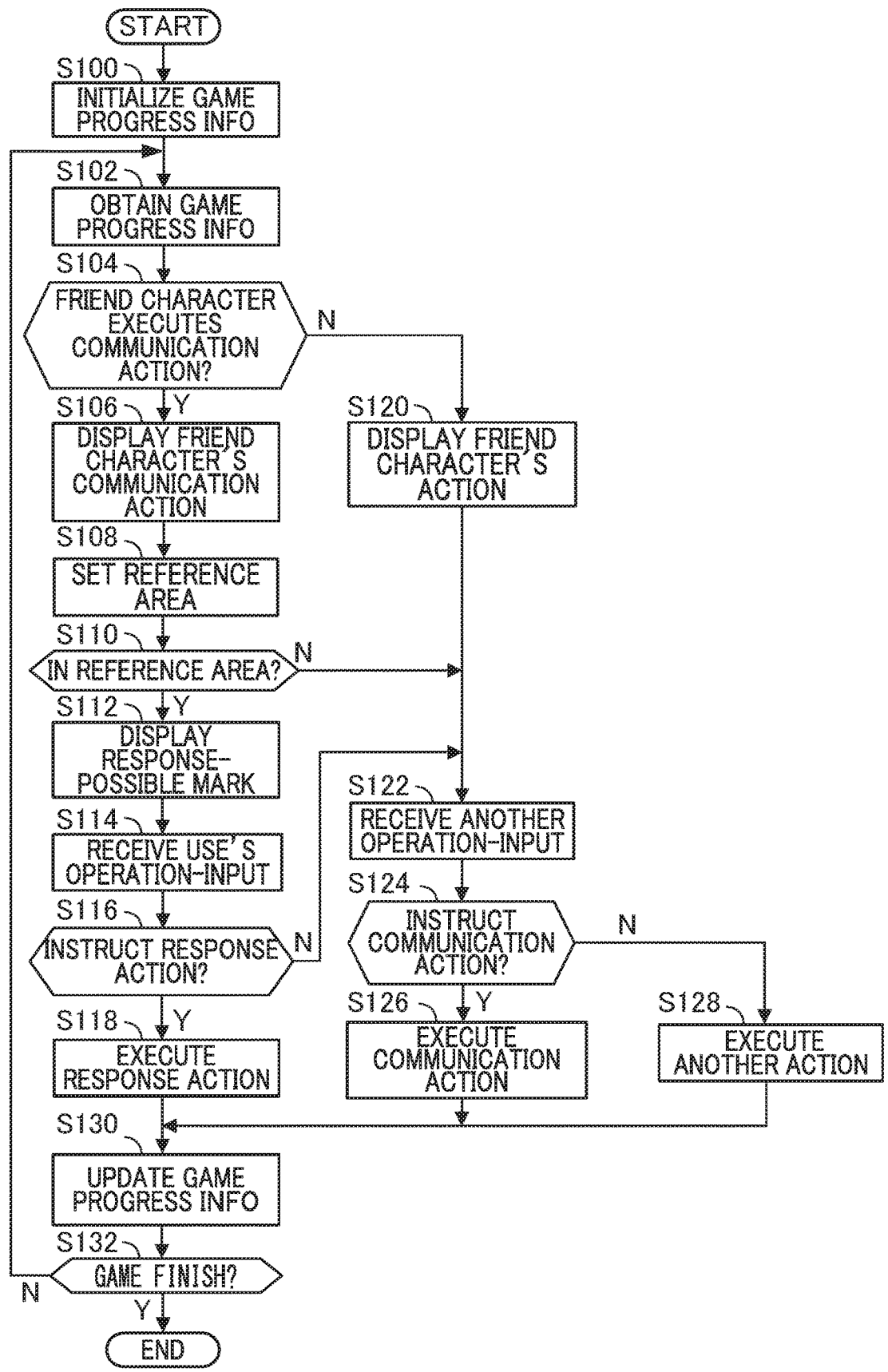
FIG. 9 is a flowchart showing an example of an operation of the game device 10.

FIG. 9 is a flowchart showing an example operation of the game device 10-1 in a case in which the game device 10-1 operated by the user U1 executes the exploratory game.

As shown in FIG. 9, when the exploratory game is started in the game device 10-1, the game controller 111 first initializes the game progress information (S100). Specifically, the game controller 111 initializes the player character management information stored in the player character management table TBL1, and the game character management information stored in the game character management table TBL2, at step S100.

FIG. 10 shows an example of the data structure of the player character management table TBL1. As shown in FIG. 10, the player character management information stored in the player character management table TBL1 includes: a user ID for identifying the user U1 operating the game device 10-1 from among the users U participating in the exploratory game; a game character ID for identifying the player character CP operated b the user U1 from among the game characters CG that are to appear in the exploratory game; a character type ID for identifying the type of the player character CP from among all the types of game characters CG that are to appear in the exploratory game; a team ID for identifying a team to which the player character CP belongs from among teams in a case in which the game characters CG appearing in the exploratory game are divided into the teams and fight; the position PsP of the player character CP in the field Fd; the orientation of the player character CP in the field Fd; the maximum hit point that is the maximum value of the hit point of the player character CP; the remaining hit points that remain for the player character CP; a skill level that indicates a magnitude of skill of the player character CP; the attack power that indicates the degree of the attack capability of the player character CP; a defense power that indicates a degree of defense capability of the player character CP; money carried by the player character CP; and an action ID for identifying the action executed by the player character CP.

FIG. 11 shows an example of the data structure of the game character management table TBL2. As shown in FIG. 11, the game character management table TBL2 includes at least one record with a one-to-one correspondence to at least one game character CG that may appear in the exploratory game. Each record included in the game character management table TBL2 stores the game character management information corresponding to a game character CG. Each piece of the game character management information includes: the game character ID for identifying the game character CG; the user ID for identifying the user U operating the game character CG; the team ID for identifying the team to which the game character CG belongs; the character type ID for identifying the type of the game character CG; the position of the game character CG in the field Fd; the orientation of the game character CG in the field Fd; the remaining hit points of the game character CG; and the action ID for identifying the action executed by the game character CG, for example.

Although detailed description is omitted, detailed information on the friend character CF operated by the user U2, for example, information on a maximum hit point, skill level, attack power, defense power, and money carried by the friend character CF and the like is stored in the player character management table TBL1 stored in the storage unit 130 of the game device 10-2 operated by the user U2. The detailed information on the enemy character CE, for example, information on the maximum hit point, the attack power and the defense power of the enemy character CE and the like is stored as the enemy character information in the enemy character information table TBL3.

At step S100, the game controller 111 sets the user ID, the game progress information, at a value that uniquely identifies each user U, sets the game character ID to a value that uniquely identifies each game character CG, and sets the team ID to a value that uniquely identifies the team to which each game character CG belongs. It is of note that if the game character CG is a non-player character not operated by the user U, the game controller 111 sets the user ID to a "Null value." At step S100, the game controller 111 sets the character type ID, the position, the orientation, the remaining hit points and the action ID of the game character CG and the like to values predetermined in the exploratory game, or to random values.

As shown in FIG. 9, the information obtainer 114 obtains the game progress information from another game device 10-2 with which the game device 10-1 communicates (S102). In this embodiment a case is assumed in which the game progress information obtained by the information obtainer 114 at step S102 is the game character management information on the friend character CF. However, the present invention is not limited to such an aspect. At step S102, the information obtainer 114 may obtain the game character management information on the enemy character CE in addition to the game character management information on the friend character CF.

As shown in FIG. 9, the action executor 113 determines whether the friend character CF executes the communication action on the basis of the game progress information obtained by the information obtainer 114 at step S102 and the action information stored in the action information table TBL4 (S104).

FIGS. 12 and 13 show an example of the data structure of the action information table TBL4. As shown in FIGS. 12 and 13, the action information table TBL4 includes multiple records with a one-to-one correspondence to all action types that may be executed by each player character in the exploratory game (an example of "executable actions"). Each record of the action information table TBL4 stores the action ID for identifying an action, and the action information representative of details of the action. The action information includes, for example, the name of the action (action name), action type information, purchase cost information, reference area information, and action-details-information.

Here, the action type information included in the action information indicates whether an action corresponding to an action ID falls into each of a communication action, a response action, and a general action. In this embodiment, the action type information includes communication action applicable information, response action applicable information, and general action applicable information. The communication action applicable information is information indicating whether the action corresponding to the action ID falls into the communication action. If the action does not fall into the communication action, "1" is indicated. If the action does not fall into the communication action, "0" is indicated. The response action applicable information is information indicating whether the action corresponding to the action ID falls into the response actions. If the action falls into the response action, "1" is indicated. If the action does not fall into the response action, "0" is indicated. The general action applicable information is information indicating whether the action corresponding to the action ID falls into the general action. If the action falls into the general action, "1" is indicated. If the action does not fall into the general action, "0" is indicated.

In this embodiment, an action is required to be preliminary purchased by the player character CP by using the money carried, to thereby access the action, in order to execute the action.

The purchase cost information included in the action information indicates the cost (the amount of money carried) of purchasing the action corresponding to the action ID. The action whose purchase cost information is set to "Null value" is an action executable without precondition of purchase by the player character CP. That is, the action whose purchase cost information is set to "Null value" is an action assumed to have been obtained at the outset by the player character CP without purchase of the action having been made by the player character CP.

It is of note that in this embodiment it is assumed that the player character CP purchases the action in the exploratory game using the money carried by the player character CP to thereby access the action. However, the present invention is not limited to such an aspect. The aspect of accessing the action in this embodiment is only an example. For example, the user U1 operating the player character CP may be able to purchase the action using something that has a value such as money carried by the user U1 separately from that for the exploratory game, thereby allowing the player character CP to obtain the action. Alternatively, an aspect may be adopted in which when a specific condition set in the exploratory game is satisfied, for example, the player character CP solves a specific problem set in the exploratory game, the player character CP is able to access the action corresponding to the condition. Alternatively, an aspect may be adopted in which when the player character CP engages in a specific task in the exploratory game or has a specific role in the exploratory game, the player character CP can access actions corresponding to the task or role.

In the following description, a case is exemplified in which Obtaining the action made by the player character CP is "purchase" of an action using the money carried by the player character CP. However, the description also applies to cases in which the action is accessed by any of the aforementioned aspects other than by "purchase."

The reference area information included in the action information indicates the shape and size of the reference area set corresponding to the player character CP when the player character CP executes the action corresponding to the action ID as the communication action.

The action-details-information included in the action information indicates specific details of the action corresponding to the action ID. The action-details-information may indicate, for example, a moving image of the player character CP in a case in which the player character CP executes an action of changing at least one of the position and attitude of the player character CP. The action-details-information may be, for example, information that is a numerical representation of the temporal movement of each part of the player character CP in a case in which the player character CP executes an action of changing at least one of the position and attitude. The action-details-information may indicate, for example, a still image corresponding to a pose when the player character CP adopts a pose.

In this embodiment, a case is assumed in which the field Fd is a three-dimensional space. Accordingly; the moving image of the player character CP may indicate the three-dimensional movement of the player character CP. Numerical data that is indicative of the temporal movement of each part of the player character CP may also indicate the three-dimensional movement of the player character CP. The still image of the player character CP may indicate the three-dimensional shape of the player character CP. However, the present invention is not limited to such an aspect. The moving image of the player character CP may indicate the two-dimensional movement of the player character CP. Numerical data that is indicative of the temporal movement of each part of the player character CP may indicate the two-dimensional movement of the player character CP. The still image of the player character CP may indicate the two-dimensional shape of the player character CP.

In this embodiment, the action-details-information indicate the details of the movement of the player character CP itself. However, the present invention is not limited to such an aspect. The action-details-information may include information on movement of the player character CP, for example, a still image or a moving image that represents a character string indicating lines spoken by the player character CP when the player character CP executes the action.

At step S104, the action executor 113 identifies the action ID of a record having the same team ID as that of the player character CP in the game character management information obtained by the information obtainer 114. Next, the action executor 113 determines whether the communication action applicable information in the action information corresponding to the identified action ID indicates "1" or not. If the communication action applicable information indicates "1," the action executor 113 determines that the friend character CF executes the communication action.

As shown in FIG. 9, if the determination result at step S104 is affirmative, the game controller 111 displays how the friend character CF executes the communication action on the field screen G1 (S106).

If the determination result at step S104 is affirmative, the reference area setter 121 sets the reference area corresponding to the friend character CF, and displays the reference area image ArF indicating the reference area, in the field screen G1 (S108).

The positional condition determiner 122 determines whether the position PsP in which the player character CP is present is in the reference area or not (S110).

If the determination result at step S110 is affirmative, the positional condition determiner 122 displays the response-possible mark RM on the field screen G1 (S112). If the determination result at step S110 is negative, the positional condition determiner 122 proceeds to step S122.

When the response-possible mark RM is displayed on the field screen G1, the user U1 can operate the operation unit 150 to instruct the player character CP to execute the response action corresponding to the communication action of the friend character CF. When the response-possible mark RM is displayed on the field screen G1 and there exist multiple types of response actions corresponding to an communication action of the friend character CF, the user U1 can operate the operation unit 150 to select one response action from among the multiple types of response actions and to instruct the player character CP to execute the selected response action. Even when the response-possible mark RM is displayed on the field screen G1, the user U1 can instruct the player character CP not to execute the response action corresponding to the communication action of the friend character CF.

In this embodiment, when the positional condition determiner 122 displays the response-possible mark RM, the action executor 113 may present to the user U1 alternative response actions (hereafter on occasion, simply "response candidate actions") executable by the player character CP, on the basis of the response action information stored in the response action information table TBL5 and of the action availability management information stored in the action availability management table TBL6.

FIG. 14 shows an example of the data structure of the response action information table TBL5. As shown in FIG. 14, the response action information table TBL5 includes multiple records having a one-to-one correspondence to the communication actions provided in the exploratory game (that is, to the actions that have communication action applicable information of "1"). Each record included in the response action information table TBL5 stores the response action information corresponding to a communication action. The response action information includes, for example, the action IDs of the respective communication actions, the action IDs of the response actions whose response action applicable information is "1," and action-related information DK indicating the relationship between the communication actions and the response actions.

In this embodiment, irrespective of a presence or absence of purchase of the response action, the action-related information DK indicates "1" if the response action is executable depending on the communication action. Only in a case in which the response action has been purchased, this information indicates "2" if the response action is executable depending on the communication action. This information indicates "0" if the response action does not correspond to the communication action. For example, in the example shown in FIG. 14, if the communication action executed by the friend character CF is the "handwaving" action, the player character CP can unconditionally execute the response "handwaving" action. However, the response action "approval" or "denial" is executable only in the case in which the response action has been purchased by the player character CP.

FIG. 15 shows an example of the data structure of the action availability management table TBL6. As shown in FIG. 15, the action availability management table TBL6 includes multiple records corresponding one-to-one to all the types of actions provided in the exploratory game. Each record of the action availability management table TBL6 stores the action ID for identifying each action, and the action availability management information. The action availability management information includes, for example, the action name, purchase history information, and action availability information.

Here, the purchase history information included in the action availability management information is information indicating whether the player character CP has purchased the action corresponding to the action ID. Specifically, the purchase history information indicates "1" if the player character CP has purchased the action corresponding to the action ID, and indicates "0" if the player character CP has not purchased the action. If the action corresponding to the action ID is an action executable irrespective of a presence or absence of purchase by the player character CP, the purchase history information is set to "2."

The action availability information included in the action availability management information indicates whether the action corresponding to the action ID is executable by the player character CP. In this embodiment, the action availability information includes communication action availability information, response action availability information, and general action availability information.

The communication action availability information (an example of "designation availability formation") indicates whether the player character CP can execute the action corresponding to the action ID as the communication action. This information indicates "1" if the action is executable, and indicates "0" if the action is not executable. The action whose communication action availability information indicates "1" is an example of "first candidate action." The response action availability information indicates whether the player character CP can execute the action corresponding to the action ID as the response action. This information indicates "1" if the action is executable, and indicates "0" if the action is not executable. The general action availability information indicates whether the player character CP can execute the action corresponding to the action ID as the general action. This information indicates "1" if the action is executable, and indicates "0" if the action is not executable.

For example, in the example shown in FIGS. 14 and 15, the player character CP has not purchased the "saluting" action. However, the action-related information DK shown in FIG. 14 indicates that the response "saluting" action is executable depending on the communication "saluting" action irrespective of a presence or absence of purchase of the "saluting" action. Accordingly, the player character CP cannot execute the "saluting" action as the communication action, but can execute the action as the response action.

This embodiment exemplifies the case in which the action availability management information includes the purchase history information and the action availability information. However, the present invention is not limited to such an aspect. The action availability management information is only required to include at least the purchase history information.

If the positional condition determiner 122 displays the response-possible mark RM, the action executor 113 first identifies the records corresponding to the communication action made by the friend character CF from the response action information table TBL5. Next, the action executor 113 identifies the response action whose action-related information DK is "1" or "2" from among the identified records. Furthermore, the action executor 113 extracts the response action whose response action availability information indicates "1" from among the identified response actions. The action executor 113 presents, to the user U1, the extracted response action as the response candidate action executable by the player character CP (an example of "second candidate action") depending on the communication action made by the friend character CF.

As shown in FIG. 9, when the positional condition determiner 122 displays the response-possible mark RM and the user U1 operates the operation unit 150, the operation receiver 112 receives the content of operation (S114).

The action executor 113 determines whether the content of operation received by the operation receiver 112 at step S114 is content that indicates execution of the response action made by the player character CP (S116).

If the determination result at step S116 is affirmative, the action executor 113 causes the player character CP to execute the response action corresponding to the communication action made by the friend character CF, and displays, on the field screen G1, how the player character CP executes the response action (S118). On the contrary, if the determination result at step S116 is negative, the action executor 113 proceeds to step S122.

In the flowchart shown in FIG. 9, the game controller 111 displays the communication action of the friend character CF at step S106, and the action executor 113 displays the response action of the player character CP at step S118. However, the present invention is not limited to such an aspect.

For example, in a case in which it is preferable that the communication action and response action be simultaneously executed such as a "high five" and a "handshake," the action executor 113 may display the communication action of the friend character CF at a timing corresponding to a start of the response action made by the player character CP at step S118. In this case, at step S106, the action executor 113 may execute a preparation action of the communication action. Here, the preparation action of the communication action has the following meanings. For example, when the communication action is a "high five," the preparation action of the communication action is an "action of extending both the arms for high five"; and when the communication action is a "handshake," the preparation action of the communication action is an "action of reaching out for handshake."

If the determination result at step S104 is negative, the game controller 111 displays how the friend character CF executes the response action or the general action (S120).

If the user U1 does not perform an operation instructing the player character CP to execute the response action, the operation receiver 112 receives another operation-input made by the user U1 (S122). Here, the other operation received by the operation receiver 112 at step S122 means, for example, an operation of instructing the player character CP to execute an operation other than the response action.

The action executor 113 determines whether the content of an operation received by the operation receiver 112 at step S122 indicates execution of the communication action made by the player character CP (S124).

If the determination result at step S124 is affirmative, the action executor 113 causes the player character CP to execute the communication action in accordance with the content of the operation received at step S122, and displays, on the field screen G1, how the player character CP executes the communication action (S126).

On the contrary, if the determination result at step S124 is negative, the action executor 113 causes the player character CP to execute the general action in accordance with the content of the operation received at step S122, and displays, on the field screen G1, how the player character CP executes the general action (S128).

Subsequently, the game controller 111 updates the game progress information on the basis of the action of the player character CP at steps S118, S126 or S128 (S130).

The game controller 111 determines whether the given game finish condition is satisfied or not (S132). In this embodiment, the game finish condition means some or all of the following: achievement of a predetermined mission; determination of incapability of achieving the predetermined mission; incapability of continuing the exploratory game by the player character CP; a lapse of a predetermined time period from start of the exploratory game; defeating all the enemy characters CE present in the field Fd and the like.

If the determination result at step S132 is affirmative, the game controller 111 finishes the processing shown in FIG. 9. On the contrary, if the determination result at step S132 is negative, the game controller 111 proceeds to step S102.

5. Conclusion of Embodiments

Conventionally, in a case in which users U communicate with each other in a game in which the users U each operate a player character in the field Fd, message exchange means, such as chat or the like, is typically used. However, if one user declares an intention to another user U through message exchange means as in the conventional case, the one user U is required to input the indicated intention as a character string, which is time consuming and labour intensive. If the intention of the one user U is declared in a character string as in the conventional case, another user U who verifies the intention of the one user U is required to verify the character string indicating the intention of the on user U in addition to the operation of the player character in the field Fd, and as a result on occasion operation of the player character may be interfered with. If the intention of the one user U is declared in a character string as in the conventional case, the character string is displayed in the field Fd in which the player character is present or is separated from the field Fd. Accordingly, there is a possibility that the sense of reality of the virtual space for the game represented in the field Fd may decrease. If the intention of the one user U is declared in a character string as in the conventional case, the one user U is required to input the character string in a short time period in parallel while also operating the player character. Accordingly, it is highly likely that the intention of the one user U will not be able to correctly be represented in the input short character string.

On the contrary, in this embodiment, the user U1 operating the player character CP uses the response action made by the player character CP to reply to the user U2 operating the friend character CF. Consequently, in this embodiment, load imposed on the user U1 for replying to the user U2 is reduced as compared with a conventional case in which a message exchange means is employed. In other words, as a result of a reduction in operation load imposed on the user U of the game device 10, by this embodiment improvement in function that is included in the game device 10 can be facilitated with supports for communication between the users U, as compared with a conventional case in which a message exchange is employed.

In this embodiment, the user U1 operating the player character CP uses the communication action made by the player character CP to declare an intention to the user U2. Consequently, in this embodiment there is an increased possibility that the user U1 will be able to declare an intention without interference occurring from operation of the player character CP, in comparison with a conventional case in which the user U1 inputs a character string to declare the intention. In other words, in view of smoothing the operation of the player character CP by the user U of the game device 10, this embodiment can facilitate improvement in function that is included in the game device 10 and supports communication between the users U, in comparison with a conventional case using message exchange means.

In this embodiment, the intention of the user U is declared as the action of the player character present in the field Fd. Consequently, in this embodiment it is possible to inhibit reduction in the sense of reality of the virtual space (field Fd) pertaining to the exploratory game accompanying communication between users U, as compared with a conventional case in which the intention of the user U is declared in a character string. In other words, in this embodiment it is possible to realize an improvement in the display function of the game device 10 with respect to a sense of reality of the virtual space pertaining to the exploratory game as compared to a conventional case in which a message exchange means is used.

In this embodiment, the intention of the user U can be declared by the action of the player character in accordance with the intention of the user U. Consequently, in this embodiment an improvement can be realized in that a declaration of intention of the user U is more accurate as compared to a conventional case in which the intention is declared in a character string. In other words, in this embodiment, accuracy of declaration of intention of the user U of the game device 10 is improved, and as a result communication is improved between the users U, as compared to a conventional case in which message exchange means is used.

In this embodiment, the action executor 113 causes the player character CP to execute the response action corresponding to the communication action made by the friend character CF on the basis of the instruction by the user U1. Accordingly, in comparison with a case in which the user U1 freely operates the player character CP and causes the player character CP to perform an action to reply to the user U2, an operating load required for a reply to be made by the user U1 to the user U2 can be reduced. In other words, by reducing the operating load required for performing an action by the user U of the game device 10, in this embodiment functionality of the game device 10 is enhanced, as a result of which communication between the users U is improved, as compared with a conventional case in which the player character CP is freely operated to execute the response action.

In this embodiment, the action executor 113 causes the player character CP to execute the response action corresponding to the communication action made by the friend character CF on the basis of the instruction by the user U1. Consequently, the player character CP can be caused to execute a more appropriate action as a reply to the user U2, as compared to a conventional a case in which the user U1 freely operates the player character CP to cause the player character CP to perform an action to reply to the user U2. In other words, improved accuracy of declaration of intention of the user U of the game device 10 results in improved communication between the uses U; and functionality of the game device 10 is enhanced, as compared to a conventional case M which the player character CP is freely operated to execute a response action.

In this embodiment, when the player character CP and the friend character CF have a predetermined positional relationship in the field Fd, the action executor 113 causes the player character CP to execute the response action corresponding to the communication action made by the friend character CF. Accordingly, if the player character CP operated by the user U1 and the friend character CF operated by the user U2 do not have an appropriate positional relationship for a reply by the user U1 to the user U2 using the response action made by the player character CP, the response action made by the player character CP may be limited. Accordingly, a possibility that the user U1 may execute an unnecessary operation can also be reduced. In other words, by inhibiting the user U of the game device 10 from causing the player character CP to execute an unnecessary response action, in this embodiment functionality of the game device 10 can be enhanced and communication between the users U improved, as compared to a conventional case in which the player character CP is freely operated to execute the response action.

B. Modifications

Each aspect described above can be changed in a variety of ways. Specific aspects of modification are exemplified as follows. Two or more aspects freely selected from the following examples can be combined as appropriate in so far as no contradiction arises. Elements in the modifications exemplified below that have operations and functions equivalent to those in the embodiment, will be denoted as in the description above, and detailed description of each such elements will be omitted, as appropriate.

Modification 1

In the embodiment described above, the reference area set to correspond to the player character has a shape and size that corresponds to the communication action made by the player character. However, the present invention is not limited to such an aspect. The reference area set to correspond to the player character may have a pre-allocated shape or size.

Modification 2

In the embodiment described above, the positioning of the player character in the field Fd includes each of the position of the player character, the orientation of the player character, and the shape and size of the reference, which are set to correspond to the player character. However, the present invention is not limited to such an aspect. The positioning of the player character in the field Fd may include at least one of the position of the player character, the orientation of the player character, and the shape and size of the reference area, which are set to correspond to the player character.

For example, if the positioning of the player character in the field Fd is defined as the position of the player character in the field Fd, the response determiner 120 may determine whether the player character CP can execute the response action corresponding to the communication action made by the friend character CF, on the basis of the position relationship between the player character CP and the friend character CF in the field Fd. In this case, the response determiner 120 may determine whether the distance between the player character CP and the friend character CF in the field Fd is equal to or less than the reference distance. That is, in this case, if the distance between the player character CP and the friend character CF in the field Fd is equal to or less than the reference distance, the action executor 113 may cause the player character CP to execute the response action.

Here, the reference distance may be a distance defined on the basis of the communication action made by the friend character CF, or a predetermined distance.

The distance between the player character CP and the friend character CF in the field. Fd may be a norm of a three-dimensional vector connecting the player character CP and the friend character CF to each other in a case in which the field Fd is a three-dimensional space. Alternatively, the distance may be a norm of a two-dimensional vector obtained by projecting the three-dimensional vector onto a predetermined two-dimensional space (for example, a horizontal plane in the field Fd).

For example, if the positioning of the player character in the field Fd is defined as the orientation of the player character in the field Fd, the response determiner 120 may determine whether the player character CP can execute the response action corresponding to the communication action made by the friend character CF, on the basis of the relationship between the orientation of the player character CP and the orientation of the friend character CF in the field Fd. In this case, when the angle between the orientation of the player character CP and the orientation of the friend character CF in the field Fd is equal to or less than a reference angle, the action executor 113 may cause the player character CP to execute the response action.

Here, the reference angle may be an angle defined on the basis of the communication action made by the friend character CF, or may be a predetermined angle.

Modification 3

In the embodiment and modifications described above, the response determiner 120 determines whether the player character CP can execute the response action corresponding to the communication action made by the friend character CF on the basis of the positional relationship between the player character CP and the friend character CF in the field Fd. However, the present invention is not limited to such an aspect. The response determiner 120 may determine whether the player character CP can execute the response action corresponding to the communication action made by the friend character CF, without consideration of the positional relationship between the player character CP and the friend character CF in the field Fd.

For example, the response determiner 120 may determine whether the player character CP can execute the response action corresponding to the communication action made b the friend character CF, on the basis of whether the player character CP and the friend character CF have a predetermined cooperative relationship. Here, the predetermined cooperative relationship may be one in which the player character CP and the friend character CF belong to the same team.

In the embodiment and modifications described above, if the player character CP and the friend character CF have a predetermined cooperative relationship (that is, the team IDs are the same), the action executor 113 causes the player character CP to execute the response action corresponding to the communication action made by the friend character CF. However, the present invention is not limited to such an aspect. Irrespective of whether the player character CP and the friend character CF have a predetermined cooperative relationship, the action executor 113 may cause the player character CP to execute the response action corresponding to the communication action made by the friend character CF, on the basis only of the positional relationship between the player character CP and the friend character CF in the field Fd.

Modification 4

In the embodiment and modifications described above, the exploratory game is executed in the game device 10. However, the present invention is not limited to such aspects. The game may be executed by use of a device having a configuration different to that of the game device 10.

Figure 16:
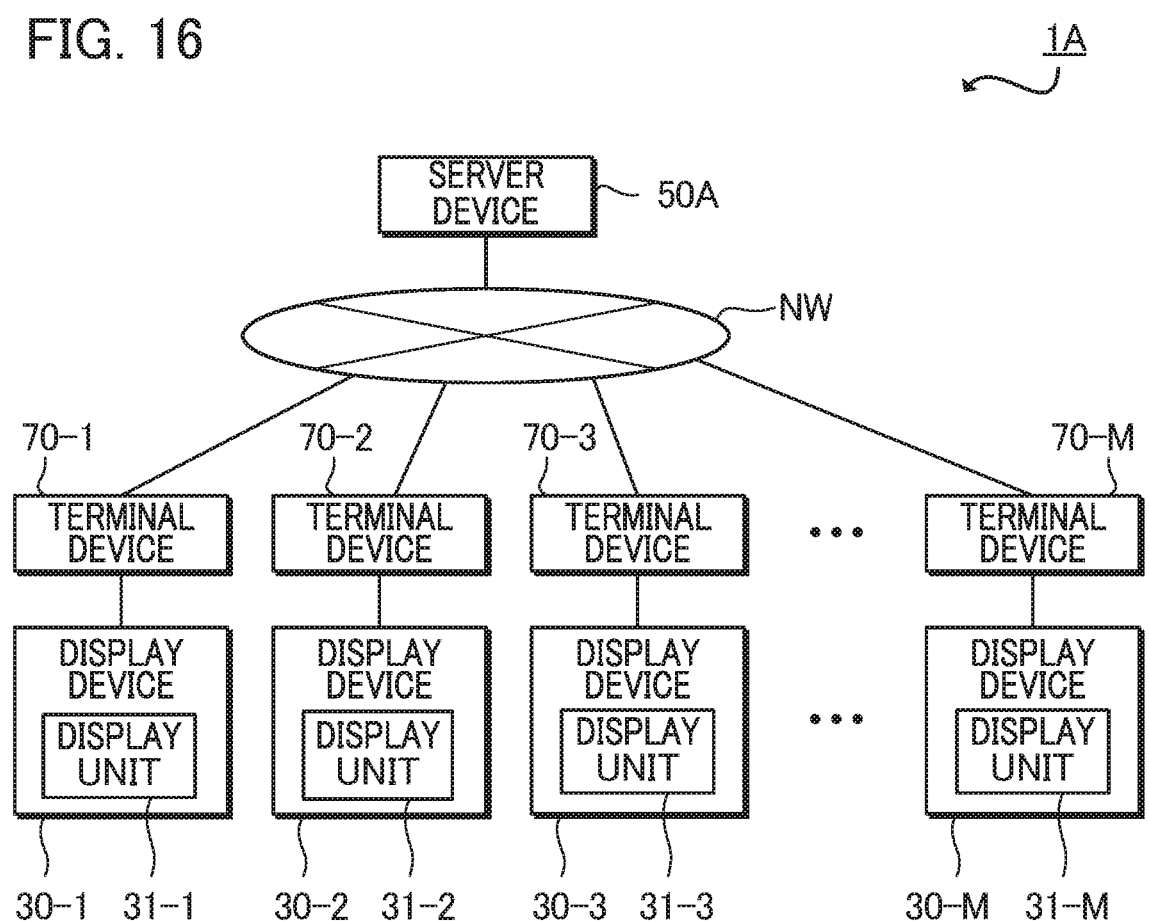
FIG. 16 is a diagram illustrating an overview of a game system 1A according to Modification 4 of the present invention.

FIG. 16 illustrates an overview of a game system 1A according to this modification. The game system 1A includes terminal devices 70 (70-1 to 70-M), display devices 30 (30-1 to 30-M) provided in correspondence to the respective terminal devices 70, and a server device 50A. The server device 50A can execute the exploratory game, and communicate with each terminal device 70 via a network NW.

Figure 17:
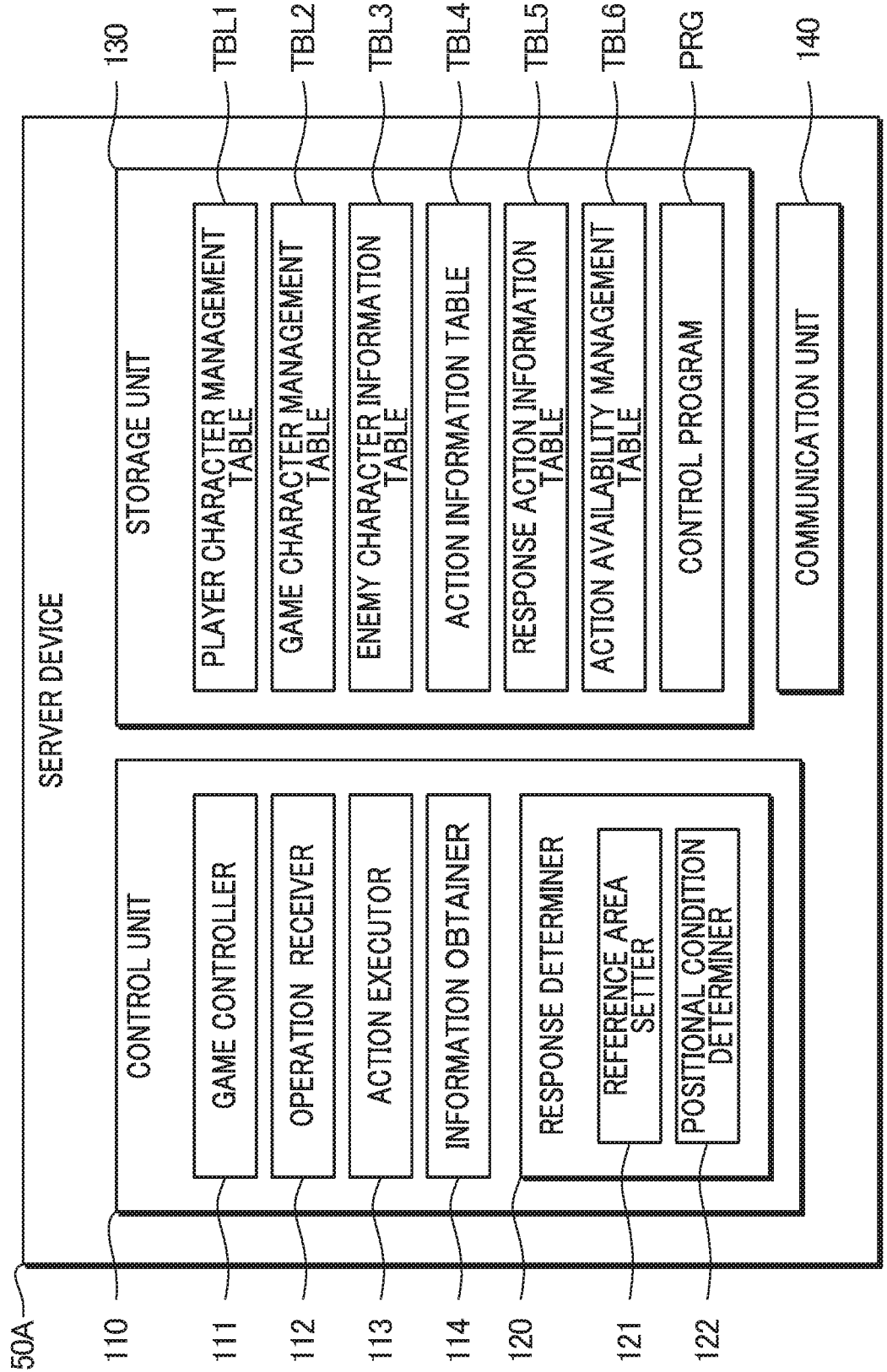
FIG. 17 is a block diagram showing an example of the configuration of a server device 50A.

FIG. 17 is a functional block diagram showing an example of the configuration of the server device 50A according to this modification. As shown in FIG. 17, the server device 50A is analogous to the game device 10 according to the embodiment shown in FIG. 1 in that the server device 50A includes the control unit 110, the storage unit 130, and the communication unit 140.

The control unit 110 included in the server device 50A generates display information that relates to the exploratory game, and supplies the generated display information to the terminal devices 70 via the communication unit 140. The terminal device 70 displays, on the display unit 31 of the display device 30, a screen that is based on the display information supplied from the server device 50A.

The information obtainer 114 provided in the control unit 110 included in the server device 50A obtains, via the communication unit 140, operation-input content made by the user U of the terminal device 70 from the terminal device 70, and executes the exploratory game on the basis of the obtained operation content.

C. Appendix

From the description above, the present invention can be understood, for example, as follows. To facilitate understanding of each aspect, in the following description, and for ease of reference, denotations used in the figures are enclosed in brackets and included. It is of note, however, that the present invention is not limited to the illustrated aspects.

Appendix 1

A recording medium according to an aspect of the present invention is a non-transitory computer readable recording medium having recorded thereon a program (e.g., a control program PRG), the program causing a processor (e.g., a processor 1000) of a game device to function as: a receiver (e.g., an operation receiver 112) configured to receive an operation-input made by a first user; and an action executor (e.g., an action executor 113) that causes a first character of a game to execute an action, based on the operation-input made by the first user when a first action made by a second character of the game is executed based on an operation-input made by a second user, the action executor configured to cause the first character to execute a second action responsive to the first action, based on the operation-input made by the first user and received by the receiver.

In this aspect, the first user operating the first character replies to the second user using the second action of the first character. Consequently, an operating load used when the first user operating the first character replies to the second user can be reduced as compared to a conventional case in which the first user replies to the second user by text, for example.

In this aspect, the action executor causes the first character to execute the second action corresponding to the first action. Accordingly, as compared to a case in which the first user freely operates the first character and causes the first character to perform an action to thereby reply to the second user, the operating load used in making the reply can be reduced. As compared to a conventional case M which the first user freely operates the first character and causes the first character to perform an action to thereby reply to the second user, the first character is caused to execute a more appropriate action in reply to the second user.

In the above aspect, the "operation-input made by the second user" may be an operation-input, for example, by which the second user operates the game device in a manner identical to operation of the game device by the first user; or by which the second user operates the game device in a manner that is different from the operation of the game device by the first user.

The "first action" may be any action executed by the first character or the second character in the game (hereafter, the first character or the second character on occasion be referred to collectively as a player character). For example, the "first action" may be an action that does not affect the progress of the game. Here, the "action that does not affect the progress of the game" may be an action, for example, that does not affect the continuity of the game by the player character, or an action that does not affect the state of the player character, such as the survival possibility of the player character or the attack power of the player character. It is of note that the "first action" may be an action that allows the first user to declare an intention made by the first character, or an action that allows the first user to communicate with the second user by way of the first action made by the first character.

The "second action" may be an action that does not affect the progress of the game. The "second action" may be an action that commences after start of the first action, or an action that commences at the same time as start of the first action. The "second action" may be an action performed as replay to the first action when the first action is performed.

Appendix 2

The recording medium according to another aspect of the present invention is the recording medium according to appendix 1, when the first character and the second character have a predetermined positional relationship in a virtual space for the game, the action executor is configured to cause the first character to execute the second action.

In this aspect, when the positional relationship between the first character and the second character is not an appropriate positional relationship with respect to reply to the second user using the second action made by the first character, execution of the second action of the first character can be limited. Consequently, the first user can be prevented from performing an unnecessary operation.

In the above aspect, the "virtual space" may be a three-dimensional space extending in the horizontal directions and in the vertical direction, or it may be a two-dimensional space extending in the horizontal directions only.

The term "positional relationship" refers to a relationship between positioning of the first character and positioning of the second character in virtual space. Here, the "positioning of the player character" may, for example, include some or all of the following: the position of the player character in the virtual space; the orientation of the player character in the virtual space; and the position and shape of the reference area of the player character provided corresponding to the player character in the virtual space. If the virtual space is a three-dimensional space, the "position of the player character" may, for example, include at least one of the position of the player character in the horizontal direction in the virtual space, and the position of the player character in the vertical direction in the virtual space. The "orientation of the player character" refers to, for example, an orientation in which the player character faces in the virtual space. The "reference area of the player character" may be provided, for example, at a position including the first character when the player character executes the first action. The "reference area of the player character" may have a predetermined shape, for example. In this case, the reference area of the player character may be two-dimensional, such as a circle, a rectangle, or an ellipse; or may be three-dimensional, such as a sphere, a polygon, or an ellipsoid. The "reference area of the player character" may have, for example, a shape defined on the basis of a first action executed by the player character when the player character executes the first action. The "reference area of the player character" may, for example, be defined on the basis of the orientation of the player character when the player character executes the first action.

The "predetermined positional relationship" may be, for example, a relationship in which the distance between the first character and the second character in the virtual space is equal to or less than the reference distance. Here, the "the distance in the virtual space" may be the distance in a three-dimensional space extending in the horizontal directions and extending in the vertical direction in a case of three dimensional space, or may be the distance in the two-dimensional space extending in the horizontal directions in a case of two dimensional space. The "predetermined positional relationship" may be, for example, a relationship in which the angle between the orientation in which the first character faces and the orientation in which the second character faces is equal to or less than the reference angle (e.g., a relationship in which the first character and the second character face each other). The "predetermined positional relationship" may be, for example, a relationship M which the angle between the orientation in which the first character faces and the line segment connecting the first character and the second character, or the angle between the orientation in which the second character faces and the line segment between the second character and the first character is equal to or less than the reference angle. The "predetermined positional relationship" may be, for example, a relationship in which the position of the first character is included within the reference area of the second character having executed the first action. The "reference distance" and the "reference angle" may be determined in accordance with the type of the first action, or in accordance with a predefined value.

Appendix 3

The recording medium according to another aspect of the present invention is the recording medium according to appendix 2, in which the program causes the processor to function further as a determiner configured (e.g., the response determiner 120) to determine whether the first character and the second character have the predetermined positional relationship based on a position of the first character in the virtual space, and at least one of a position and a shape of a reference area provided corresponding to the second character in the virtual space.

In this aspect, it is determined whether the positional relationship between the first character and the second character is an appropriate positional relationship for a reply to the second user using the second action made by the first character. Consequently, the first user can be prevented from performing an unnecessary operation.

Appendix 4

The recording medium according to another aspect of the present invention is the recording medium according to appendix 2, in which, when a distance between the first character and the second character is equal to or less than a reference distance in a virtual space for the game, the action executor is configured to cause the first character to execute the second action.

In this aspect, when the distance between the first character and the second character is not an appropriate distance for a reply to the second user using the second action made by the first character, execution of the second action of the first character can be limited. Consequently, the first user can be prevented from performing an unnecessary operation.

Appendix 5

The recording medium according to another aspect of the present invention is the recording medium according to any of appendixes 1 to 4, in which, when the first character and the second character have a predetermined cooperative relationship in the game, the action executor is configured to cause the first character to execute the second action.

In this aspect, if the first character and the second character have the predetermined cooperative relationship, and for the game to progress, the first user and the second user are required to communicate with each other, and the second user is caused to make a replay using the second action of the first character. Consequently, the first user can be prevented from performing an unnecessary operation.

In the above aspect, the "predetermined cooperative relationship" may be a relationship in which the first character and the second character are able to cooperate with each other, whereby the game progresses, for example.

The "relationship in which the first character and the second character are able to cooperate with each other, whereby the game progresses" may be, for example, a relationship in which if multiple player characters assemble as a team, whereby the game progresses, the first character and the second character belong to the same team.

Appendix 6

The recording medium according to another aspect of the present invention is the recording medium according to any of appendixes 1 to 5, in which, the action executor is configured to cause the first character to execute the first action, based on the operation-input made by the first user, in which, the first action is an action designated from among first candidate actions, based on the operation-input made by the first user, and in which, the first candidate actions are actions that have been selected by the first user from among different executable actions.

In this aspect, the first action is an action designated from among the first candidate actions. Consequently, as compared with a conventional case in which the first action is one predetermined type action, more accurate communication between the users can be achieved.

In this aspect, the first candidate actions are actions selected from among the executable actions. Consequently, as compared with a conventional case in which the first candidate actions are predetermined type actions, an intention can be more freely declared by the first user.

Appendix 7

The recording medium according to another aspect of the present invention is the recording medium according to appendix 6, in which, the game device includes a storage unit configured to store: action information representative of the executable actions; and designation availability information indicative of whether the first user is allowed to designate each of the executable actions as the first action.

In this aspect, the first character executes the first action on the basis of the action information stored in the game device. For example, as compared with a conventional case in which the action information is stored in a device exterior to the game device, a processing load, and a communication load and the like are reduced in a case in which the first character executes the first action.

Appendix 8

The recording medium according to another aspect of the present invention is the recording medium according to appendix 6 or 7, in which, even in a case in which the second action is not included among the first candidate actions, the action executor is configured to cause the first character to execute the second action.

In this aspect, as compared with a case in which the second action is limited to the first candidate action, the first character is able to execute a second action that is more appropriate for reply to the second user.

Appendix 9

The recording medium according to another aspect of the present invention is the recording medium according to any of appendixes 1 to 8, in which, the second action is an action designated from among second candidate actions, based on the operation-input made by the first user, and in which, each of the second candidate actions is an action corresponding to the first action.

In this aspect, the second action is an action designated from among the second candidate actions. Consequently, as compared with a conventional case in which the second action is one predetermined type action, an intention can be more freely declared by the first user.

Appendix 10

The recording medium according to another aspect of the present invention is the recording medium according to any one of appendixes 1 to 9, in which, the second character starts the first action at a timing corresponding to a start of the second action made by the first character.

In this aspect, synchronization between the first action and the second action can be facilitated. Consequently, smooth communication between the first user and the second user can be facilitated.

Appendix 11

A game device according to an aspect of the present invention, includes: an receiver configured to receive an operation-input made by a first user; and an action executor configured to cause a first character of a game to execute an action, based on the operation-input made by the first user, in which, when a first action made by a second character of the game is executed, based on an operation-input made by a second user, the action executor is configured to cause the first character to execute a second action responsive to the first action, based on the operation-input made by the first user and received by the receiver.

In this aspect, an operating load under which the first user causes the first character to reply to the second user is reduced as compared with a conventional case in which the first user replies to the second user in text, for example. In this aspect, the operating load for making a reply can be reduced as compared with a case in which the first user freely operates the first character to reply to the second user. In this aspect, the first character is able to execute a more appropriate action as a reply to the second user as compared to a conventional case in which the first user freely operates the first character to reply to the second user.

Appendix 12

A game system according to an aspect of the present invention is a game system including a first game device, and a second game device communicable with the first game device, in which, the first game device includes: a first receiver configured to receive an operation-input made by a first user; and a first action executor configured to cause a first character of a game to execute an action, based on the operation-input made by the first user and received by the first receiver, and in which, the second game device includes: a second receiver configured to receive an operation-input made by a second user; and a second action executor configured to cause a second character of the game to execute a second action responsive to the first action, based on the operation-input made by the second user and received by the second receiver, when the first character executes the first action.

In this aspect, the first user and the second user facilitate communication using the first action of the first character and the second action of the second character. Consequently, the operating load for communication can be reduced as compared with a conventional case in which communication is facilitated by use of text, for example. In this aspect, the second user causes the second character to execute the second action corresponding to the first action to reply to the first user. Consequently, the operating load for making a reply can be reduced as compared with a conventional case in which the second user freely operates the second character to reply to the first user. In this aspect, the second character is able to execute a more appropriate action in reply to the first user, as compared with a conventional case in which the second user freely operates the second character to reply to the first user.

DESCRIPTION OF REFERENCE SIGNS

1 . . . Game system, 10 . . . Game device, 30 . . . Display device, 110 . . . Control unit, 111 . . . Game controller, 112 . . . Operation receiver, 113 . . . Action executor, 114 . . . information obtainer, 120 . . . Response determiner, 121 . . . Reference area setter, 122 . . . Positional condition determiner, 130 . . . Storage unit, 140 . . . Communication unit, 150 . . . Operation unit, 1000 . . . Processor.

What is claimed is:

1. A non-transitory computer readable recording medium having recorded thereon a program for a game device having a processor, the program causing the processor to:
   receive an operation-input made by a first user;
   determine an orientation of a first character and a second character of a game when the operation-input is received;
   cause the first character of the game to execute an action, based on the operation-input made by the first user and based on the orientation of the first character and the second character,
   wherein when a preparation action of a first action being a communication directed to the first character of the game made by the second character of the game is executed based on an operation-input made by a second user, the program causes the processor to:
   identify a second action being a communication directed to the second character corresponding to and as a communication response to the first action; and
   cause the first character to execute the second action based on the operation-input made by the first user and based on the orientation of the first character and the second character, and
   wherein the second character starts the first action at a timing corresponding to a start of the second action made by the first character.

2. The recording medium according to claim 1, wherein when the first character and the second character have a predetermined positional relationship in a virtual space for the game, the program causes the processor to cause the first character to execute the second action.

3. The recording medium according to claim 2, wherein the program causes the processor to determine whether the first character and the second character have the predetermined positional relationship based on a position of the first character in the virtual space, and at least one of a position and a shape of a provided reference area that corresponds to the second character in the virtual space.

4. The recording medium according to claim 2, wherein when a distance between the first character and the second character is equal to or less than a reference distance in a virtual space for the game, the program causes the processor to cause the first character to execute the second action.

5. The recording medium according to claim 1, wherein when the first character and the second character have a predetermined cooperative relationship in the game, the program causes the processor to cause the first character to execute the second action.

6. The recording medium according to claim 1,
   wherein the program causes the processor to cause the first character to execute an action identical to the first action made by the second character, based on the operation-input made by the first user,
   wherein the action identical to the first action is an action designated from among first candidate actions, based on the operation-input made by the first user, and
   wherein the first candidate actions are actions that have been selected by the first user from among executable actions.

7. The recording medium according to claim 6, wherein the game device includes a storage that is operatively coupled to the processor, the storage is configured to store:
   action information representative of the executable actions; and
   designation availability information indicative of whether the first user is able to designate each of the executable actions as the action identical to the first action made by the second character.

8. The recording medium according to claim 6, wherein even in a case in which the second action is not included among the first candidate actions, the program causes the processor to cause the first character to execute the second action.

9. The recording medium according to claim 1,
   wherein the second action is an action designated from among second candidate actions, based on the operation-input made by the first user, and
   wherein each of the second candidate actions is an action corresponding to the first action.

10. The recording medium according to claim 1, wherein the first action comprises a communication action in the game, and the second action comprises a responsive action to the communication action.

11. The recording medium according to claim 10, wherein the game is an exploratory game, the first action and the second action each comprises an action that does not affect progress of the exploratory game.

12. The recording medium according to claim 1, wherein the game is an exploratory game, the first action and the second action each comprises an action that does not affect progress of the exploratory game.

13. The recording medium according to claim 1, wherein the second action is preselected from among a plurality of executable actions set in advance by the first user.

14. The recording medium according to claim 1, wherein the specific condition includes purchase of the action using money.

15. A game device comprising:
a processor; and
a memory that is operatively coupled to the processor and is configured to store instructions executed by the processor,
wherein upon execution of the instructions the processor is configured to:
receive an operation-input made by a first user;
determine an orientation of a first character and a second character of a game when the operation-input is received;
cause the first character of the game to execute an action, based on the operation-input made by the first user and based on the orientation of the first character and the second character,
wherein when a preparation action of a first action being a communication directed to the first character of the game made by the second character of the game is executed, based on an operation-input made by a second user, the processor is configured to
identify a second action being a communication directed to the second character corresponding to and as a communication response to the first action; and
cause the first character to execute the second action based on the operation-input made by the first user and based on the orientation of the first character and the second character, and
wherein the second character starts the first action at a timing corresponding to a start of the second action made by the first character.

16. A game system comprising:
a first game device; and
a second game device communicable with the first game device,
wherein the first game device includes:
a first processor; and
a first memory that is operatively coupled to the first processor and is configured to store first instructions executed by the first processor,
wherein upon execution of the first instructions the first processor is configured to:
receive an operation-input made by a first user;
determine an orientation of a first character and a second character of a game when the operation-input is received;
cause the first character of the game to execute an action, based on the operation-input made by the first user and based on the orientation of the first character and the second character, and
wherein the second game device includes:
a second processor; and
a second memory that is operatively coupled to the second processor and is configured to store second instructions executed by the second processor,
wherein upon execution of the second instructions the second processor is configured to:
receive an operation-input made by a second user; and
when the first character executes a preparation action of a first action being a communication directed to the second character in the game, the second processor is configured to cause the second character of the game to identify a second action being a communication directed to the second character corresponding to and as a communication response to the first action, and
cause the first character to execute the second action based on the operation-input made by the second user and based on the orientation of the first character and the second character,
wherein the second character starts the first action at a timing corresponding to a start of the second action made by the first character.

* * * * *